United States Patent
Chen et al.

(10) Patent No.: US 12,449,890 B2
(45) Date of Patent: Oct. 21, 2025

(54) POWER SAVING MODE CONTROL FOR A MEMORY INSTANCE

(71) Applicant: Arm Limited, Cambridge (GB)

(72) Inventors: Andy Wangkun Chen, Austin, TX (US); Yew Keong Chong, Austin, TX (US); Sriram Thyagarajan, Austin, TX (US); Munish Kumar, Noida (IN); Vivek Asthana, Greater Noida (IN); Andrew John Turner, Cambridge (GB); Alex James Waugh, Cambridge (GB)

(73) Assignee: Arm Limited, Cambridge (GB)

( * ) Notice: Subject to any disclaimer, the term of this patent is extended or adjusted under 35 U.S.C. 154(b) by 41 days.

(21) Appl. No.: 18/474,400

(22) Filed: Sep. 26, 2023

(65) Prior Publication Data

US 2025/0103129 A1 Mar. 27, 2025

(51) Int. Cl.
*G06F 1/26* (2006.01)
*G06F 1/32* (2019.01)
*G06F 1/3296* (2019.01)
*G06F 12/0815* (2016.01)

(52) U.S. Cl.
CPC ........ *G06F 1/3296* (2013.01); *G06F 12/0815* (2013.01)

(58) Field of Classification Search
CPC .................. G06F 1/3296; G06F 12/0815
See application file for complete search history.

(56) References Cited

U.S. PATENT DOCUMENTS

| 11,520,499 | B1 * | 12/2022 | Cermak | G06F 3/0634 |
| 2010/0235669 | A1 * | 9/2010 | Miyamuko | G06F 9/45558 718/1 |
| 2011/0153947 | A1 * | 6/2011 | Nomoto | G06F 9/3802 711/125 |
| 2014/0052961 | A1 * | 2/2014 | Vorbach | G06F 9/38 712/33 |
| 2015/0009772 | A1 | 1/2015 | Chen et al. | |
| 2019/0065086 | A1 * | 2/2019 | Margetts | G06F 13/1668 |
| 2021/0286755 | A1 * | 9/2021 | Vorbach | G06F 9/3888 |

OTHER PUBLICATIONS

Arm Dynamiq Shared Unit, Technical Reference Manual, 2023, Document ID: 100453_0401, Issue 04. 254 pages.

* cited by examiner

*Primary Examiner* — Mohammed H Rehman
(74) *Attorney, Agent, or Firm* — NIXON & VANDERHYE P.C.

(57) ABSTRACT

A memory instance comprises a plurality of banks of storage cells to store data values, and input/output circuitry shared between the plurality of banks for receiving write data or outputting read data. Each bank of storage cells supports a power saving mode and an operational mode. A control interface receives power control signals for controlling use of the power saving mode. Bank power control circuitry individually controls, for each of a plurality of subsets of banks of storage cells within the same memory instance, whether that subset of banks is in the power saving mode based on the power control signals. For at least one setting for the power control signals, one subset of banks is in the power saving mode while another subset of banks in the same memory instance is in the operational mode. Also disclosed is power control circuitry which selects the power mode to use for each subset of banks and generates the power control signals.

18 Claims, 11 Drawing Sheets

POWER SAVING MODE CONTROL FOR A MEMORY INSTANCE

BACKGROUND

Technical Field

The present technique relates to the field of power control for a memory instance comprising banks of storage cells.

Technical Background

A memory instance may comprise two or more banks of storage cells for storing data values. The memory instance can be used as data storage within a data processing apparatus. For example, the memory instance may be used as a cache or as main memory for a processor system.

SUMMARY

At least some examples of the present technique provide a memory instance comprising:
- a plurality of banks of storage cells to store data values, each bank of storage cells configured to support a power saving mode for retention of the data values in a state in which the storage cells are not readable or writable and power consumption is lower than in an operational mode in which the storage cells are readable and writable;
- input/output circuitry shared between the plurality of banks for receiving write data from external circuitry or outputting read data to the external circuitry;
- a control interface comprising a plurality of power control signal paths to receive power control signals for controlling use of the power saving mode by the plurality of banks; and
- bank power control circuitry to individually control, for each of a plurality of subsets of banks of storage cells within the same memory instance, whether that subset of banks is in the power saving mode based on the power control signals received on the plurality of power control signal paths;
- where for at least one setting for the power control signals, the bank power control circuitry is configured to place one subset of banks of storage cells in the power saving mode while another subset of banks of storage cells is in the operational mode.

At least some examples provide an apparatus comprising:
at least one processor; and
a cache comprising at least one memory instance as described above.

At least some examples provide power mode control circuitry for controlling power mode transitions for a memory instance comprising a plurality of banks of storage cells and input/output circuitry shared between the plurality of banks for receiving write data from external circuitry or outputting read data to the external circuitry;
the power mode control circuitry comprising:
power mode selection circuitry to select a selected power mode separately for each of a plurality of subsets of banks within the same memory instance, the selected power mode selected from a plurality of power modes including an operational mode in which the storage cells are readable and writable and a power saving mode for retention of the data values in a state in which the storage cells are not readable or writable and power consumption is lower than in the operational mode, wherein the power mode selection circuitry is configured to select the selected power mode for each subset of banks based on monitoring of accesses to the memory instance; and
power control signal transmitting circuitry to transmit to the memory instance a plurality of power control signals indicative of the selected power mode for each of the subset of banks.

At least some examples provide a system comprising:
the memory instance and/or the power control circuitry described above, implemented in at least one packaged chip;
at least one system component; and
a board,
wherein the at least one packaged chip and the at least one system component are assembled on the board.

At least some examples provide a chip-containing product comprising the system described above assembled on a further board with at least one other product component.

At least some examples provide a non-transitory computer-readable medium to store computer-readable code for fabrication of a memory instance comprising:
- a plurality of banks of storage cells to store data values, each bank of storage cells configured to support a power saving mode for retention of the data values in a state in which the storage cells are not readable or writable and power consumption is lower than in an operational mode in which the storage cells are readable and writable;
- input/output circuitry shared between the plurality of banks for receiving write data from external circuitry or outputting read data to the external circuitry; and
- a control interface comprising a plurality of power control signal paths to receive power control signals for controlling use of the power saving mode by the plurality of banks; and
- bank power control circuitry to individually control, for each of a plurality of subsets of banks of storage cells within the same memory instance, whether that subset of banks is in the power saving mode based on the power control signals received on the plurality of power control signal paths;
- where for at least one setting for the power control signals, the bank power control circuitry is configured to place one subset of banks of storage cells in the power saving mode while another subset of banks of storage cells is in the operational mode.

At least some examples provide a non-transitory computer-readable medium to store computer-readable code for fabrication of power mode control circuitry for controlling power mode transitions for a memory instance comprising a plurality of banks of storage cells and input/output circuitry shared between the plurality of banks for receiving write data from external circuitry or outputting read data to the external circuitry;
the power mode control circuitry comprising:
power mode selection circuitry to select a selected power mode separately for each of a plurality of subsets of banks within the same memory instance, the selected power mode selected from a plurality of power modes including an operational mode in which the storage cells are readable and writable and a power saving mode for retention of the data values in a state in which the storage cells are not readable or writable and power consumption is lower than in the operational mode, wherein the power mode selection circuitry is configured to select the selected power mode for each subset of banks based on monitoring of accesses to the memory instance; and power control signal transmitting circuitry to transmit to the memory instance a plurality of power control signals indicative of the selected power mode for each of the subset of banks.

Further aspects, features and advantages of the present technique will be apparent from the following description of examples, which is to be read in conjunction with the accompanying drawings.

DESCRIPTION OF EXAMPLES

Figure 1:
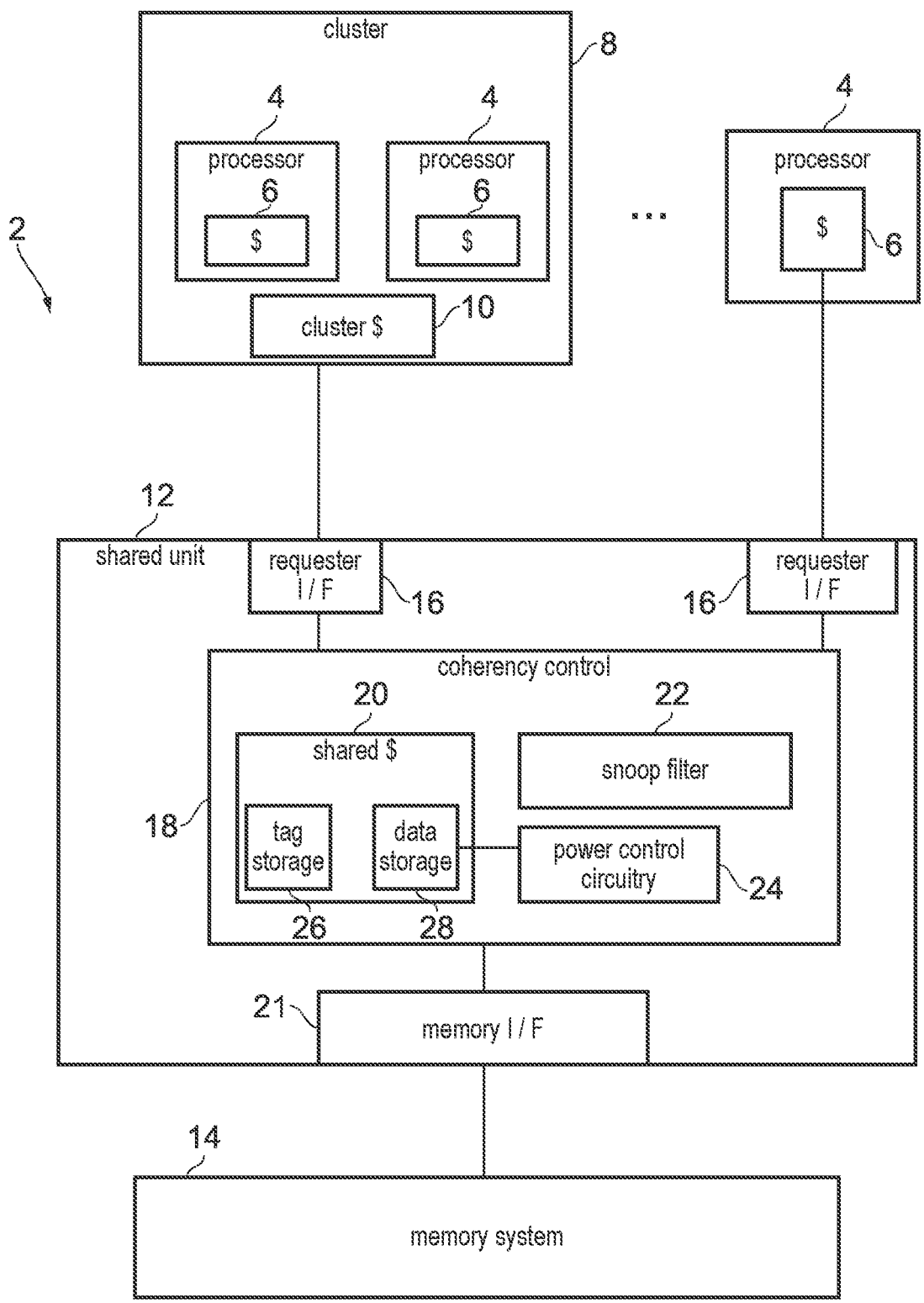
FIG. 1 illustrates an apparatus.

A memory instance comprises two or more banks of storage cells to store data values. The memory instance comprises input/output circuitry shared between the plurality of banks for receiving write data from external circuitry or outputting read data to the external circuitry. For example, the input/output circuitry may comprise any of: pins for transferring read data, write data or addresses between the memory instance and external circuitry; associated write drivers for driving internal signal lines within the memory instance based on write data; and/or read drivers for driving the interface pins to the external circuitry based on read data read from the banks of storage cells.

Each bank supports a power saving mode for retention of the data values in a state in which the storage cells are not readable or writable and power consumption is lower than in an operational mode in which the storage cells are readable and writable. The power saving mode can be useful to enable power savings at times when there are no accesses to the memory instance, but when the memory instance may need to be woken up relatively quickly if an access request is received. A transition between the power saving mode and the operational mode may be faster than a transition between a power off mode and the operational mode, where the power off mode is a mode in which retention of the data values is not guaranteed and power consumption is even lower than in the power saving mode. Hence, the power saving mode can be regarded as a "quick nap" mode which allows power savings to be achieved in periods between accesses.

In a typical memory instance, control of use of the power saving mode is performed for all banks in the memory instance collectively, so that either all banks in the memory instance are in power saving mode or none of the banks in the memory instance are in power saving mode. Hence, if it is desired to be able to control power saving mode separately for different subsets of banks of storage cells, it would be needed to separate these banks into separate memory instances. However, splitting a larger memory instance into a number of smaller instances incurs a cost in terms of circuit area, power consumption and performance, because each memory instance will have its own set of input/output circuitry, and this duplication increases circuit area (and hence power consumption) and increases signal propagation latency.

In the examples discussed below, a memory instance is provided with a control interface comprising a plurality of power control signal paths to receive power control signals for controlling use of the power saving mode by the plurality of banks. Bank power control circuitry individually controls, for each of two or more subsets of banks of storage cells within the same memory instance, whether that subset of banks is in the power saving mode based on the power control signals received on the plurality of power control signal paths. For at least one setting for the power control signals, the bank power control circuitry can place one subset of banks of storage cells in the power saving mode while another subset of banks of storage cells within the same memory instance is in the operational mode.

Hence, by providing a control interface enabling external circuitry to independently specify which individual subsets of banks are to be placed in the power saving mode, this avoids a need to separate the subsets of banks into separate memory instances merely to provide more fine-grained power saving control. Hence, a memory instance offering power saving control per subset of banks can enable the overall circuit area and power consumption of a processing system to be reduced.

Also, for a given memory instance, the separate control of the power saving mode usage for each subset of banks allows greater opportunity for power savings because now storage cells in one subset of banks which has not been accessed for some time can be switched to the power saving mode even if accesses are continuing for another subset of banks of the same memory instance, preventing the memory instance as a whole from entering the power saving mode.

The use of the power saving mode can be controlled at different granularities. In some examples, each subset of banks comprises a single bank, so that individual control of use of the power saving mode is provided for each bank.

In other examples, power saving mode usage can be controlled at granularity of subsets of two or more banks. Each subset could comprise the same number of banks in some examples. Other examples could have subsets of banks with different numbers of banks.

The power saving mode may be implemented in a variety of ways. For example, various components of the banks of storage cells may be disabled during the power saving mode or may be caused to consume less leakage power by reducing a supply voltage applied to such components.

In some examples, when a given bank is in the power saving mode, the bank power control circuitry disables precharging of bitlines for the given bank. Each storage cell may be coupled to a pair of bitlines used to transfer a data bit to the storage cell during a write operation, or to read out a data bit from the storage cell during a read operation. In operational mode, the bitlines may be precharged to a logic-1 (logic high) level shortly before the read/write cycle starts, which helps to make read/write operations more stable than if the bitlines were at logic-0 (logic low) before the read/write of a selected storage cell begins. However, precharging the bitlines consumes power. By disabling the precharge in the power saving mode, power consumption can be reduced. Precharging of the bitlines can be disabled separately for each subset of banks in the same memory instance.

In some examples, when a given bank is in the power saving mode, the bank power control circuitry disables precharging of write data lines and/or read data lines for the given bank. The write data lines are lines used to supply write data to write drivers which drive the bitlines during a write operation. The read data lines are lines used to read out read data from sense amplifiers which are coupled to the bitlines to read out bits read from the storage cells during a read operation. Again, precharging of the write data lines and read data lines can provide more stable write/read operations, but this consumes power, which can be saved by disabling the precharging during the power saving mode. Disabling of the precharging of the write data lines and/or read data lines can be controlled separately for each subset of banks.

In some examples, when a given bank is in the power saving mode, the bank power control circuitry disables a word line driver configured to drive word lines for the given bank. The word lines are lines used to select which cell to access in a column of storage cells sharing a pair of bitlines. Disabling of the word line driver (e.g. by power gating, to shut off a voltage supply to the word line driver) can help to save power during the power saving mode. Disabling of the word line driver can be controlled separately for each subset of banks.

In some examples, when a given bank is in the power saving mode, the bank power control circuitry disables a word line decoder configured to decode an address to select a word line to be driven for the given bank. Again, this can provide a contribution to reducing power consumption in the power saving mode. Disabling of the word line decoder can be controlled separately for each subset of banks.

In some examples, when a given bank is in the power saving mode, the bank power control circuitry reduces a supply voltage supplied to the storage cells of the given bank to a lower voltage level than a voltage level used for the supply voltage in the operational mode. Again, reducing the supply voltage to the storage cells can save power. The level of the supply voltage to which the voltage is reduced may still be high enough to enable retention of the bit values stored in the storage cells. Reduction of the supply voltage to the storage cells may be controlled separately for each of the subsets of banks. In one example, the reduction in supply voltage to the storage cells may be implemented by providing a diode-connected transistor (a transistor with its gate coupled to its drain terminal) on the supply voltage path to the storage cells, and a bypass path bypassing the diode connected transistor which may be selectively activated so that it is open in the operational mode and shut off in the power saving mode.

Hence, there are a number of ways in which power consumption can be reduced during the power saving mode. Any one or more of these techniques can be used individually or in combination. A given implementation of the memory instance may use one subset of these power reducing techniques, while another implementation of the memory instance may use another subset of these power reducing techniques.

Some examples may support a number of different variants of the power saving mode corresponding to different combinations of one or more of the power saving measures being active, so that it can be selected which subset of power saving measures is used at a given time. In this case, the power control signals may have an encoding identifying which variant of the power saving mode is to be used.

The power control signals can be encoded in different ways. In some examples, the power control signals comprise a separate power control signal (or separate set of two or more power control signals) for each subset of banks, each indicating whether a corresponding subset of banks is to be placed in the power saving mode. Hence, the power control signals may be encoded with a separate set of one or more signals for each subset of banks. This approach can use more pins on the control interface, but avoids a need for any internal circuit logic within the memory instance to decode the power control signals to generate the signals indicating to each subset of banks whether the subset of banks should be in the operational mode or the power saving mode.

In other examples, the memory instance may comprise power control signal decoding circuitry to decode the power control signals received on the power control signal paths to generate separate internal power control signals for each subset of banks, each internal power control signal indicating whether a corresponding subset of banks is to be placed in the power saving mode. In this case, the control interface may have fewer power control signal pins than in the case where there are separated sets of pins for each subset of banks.

The memory instance could be used for a variety of purposes within a processing system, such as main memory (random access memory), as a cache structure, or for other control structures.

However, in one example an apparatus comprises at least one processor and a cache, where the cache comprises at least one memory instance as described above. The techniques described above may be particularly suited where the memory instance is used as a cache (rather than main memory), as the cache may be accessed more frequently than a particular memory instance used as main memory, so that it may be less likely that there are significant periods of time when the memory instance is not being accessed at all. Nevertheless, there can be times when a particular subset of banks of the memory instance are not being accessed and so could benefit from the power saving mode. Therefore, the ability to make separate decisions on whether to enter the power saving mode for each subset of banks within the same memory instance can be particularly useful where the memory instance is used as a cache.

More particularly, the apparatus may comprise coherency control circuitry to manage coherency of data cached in private caches of two or more processors; and a shared cache associated with the coherency control circuitry and shared between the two or more processors. The shared cache may comprise at least one memory instance described above. For the shared cache at a point of the system where coherency is controlled relative to a number of processors having their own private caches, reducing power consumption can be a greater priority than shortening access latency, and so use of the power saving mode can be attractive to ensure greater power savings even if sometimes there is increased latency due to having to wake up from the power saving mode when an access to a given bank is needed. Hence, the ability to enter the power saving mode independently for each subset of banks can be particularly useful for a memory instance used as part of the shared cache associated with the coherency control circuitry, to enable greater opportunities for power savings in windows of time when one subset of banks are not being accessed but accesses are ongoing to another subset of banks.

Complementary to the memory instance, power mode control circuitry may be provided for controlling power mode transitions for the memory instance. The power mode control circuitry may comprise power mode selection circuitry to select a selected power mode separately for each of a plurality of subsets of banks within the same memory instance. The selected power mode is selected from a plurality of power modes including an operational mode in which the storage cells are readable and writable and a power saving mode for retention of the data values in a state in which the storage cells are not readable or writable and power consumption is lower than in the operational mode. The power mode selection circuitry selects the selected power mode for each subset of banks based on monitoring of accesses to the memory instance. The power control circuitry also includes power control signal transmitting circuitry to transmit to the memory instance a plurality of power control signals indicative of the selected power mode for each of the subset of banks.

Hence, the power mode control circuitry has the functionality to monitor accesses to the memory instance and, depending on the monitored accesses, make decisions on which subsets of banks to switch to/from the power saving mode, with the ability to separately control which individual subsets of banks are in the power saving mode. This supports the circuit area, power consumption and performance advantages discussed above for the memory instance.

The power mode control circuitry can be provided external to the memory instance. For example, in the example apparatus discussed above where the memory instance is used as part of a shared cache, the power mode control circuitry may be associated with the shared cache and coherency control circuitry. Alternatively, if the memory instance is used as part of a private cache of a processor, the power mode control circuitry may be associated with that processor.

In the case where the memory instance is used as data storage for a cache structure, the power mode selection circuitry may trigger a transition of a given subset of banks to the operational mode in response to detecting a tag access request to request a cache tag from tag storage circuitry for an address corresponding to the given subset of banks of the memory instance. When waking up the given subset of banks, control circuitry associated with the cache may implement a warmup delay between the tag access request being issued to the tag storage circuitry and a corresponding data access being issued to the given subset of banks, to allow time for the given subset of banks to wake up to the operational mode. This delay may be a fixed hardwired delay, or could be programmable to allow variation of the delay under control of a control parameter specified by a user. Programming the warmup delay can be useful to allow a trade-off between performance (a shorter delay can help improve performance) and inrush current reduction (a longer delay can help support a slower transition between the power saving mode and the operational mode, e.g. by a more gradual staggering of the timings at which the various power saving measures mentioned earlier are removed), which can help to limit the peak current which rushes in when internal nodes of the circuit become charged when switching back to the operational mode. If inrush current is too high, this can cause instability of operation in other parts of the system, which can risk errors of operation, so measures to reduce inrush current can be useful.

When transitioning two or more subsets of banks from the power saving mode to the operational mode, the power mode selection circuitry may stagger entry into the operational mode for the two or more subsets of banks, to provide a delay between one of the two or more subsets of banks transitioning from the power saving mode to the operational mode and another of the two or more subsets of banks within the same memory instance transitioning from the power saving mode to the operational mode. Again, this delay can be fixed or programmable. A longer delay favours greater inrush current reduction, while a shorter delay can favour improved memory system performance as the banks become available for access faster after being in the power saving mode. In systems comprising two or more memory instances, the delay for staggering wakeups between successive subsets of banks could also be different when, after waking up a given subset of banks, the next subset of banks to be woken up is in the same memory instance, compared to the delay used when the next subset of banks to be woken up is in a different memory instance to the given subset of banks.

The power mode selection circuitry may maintain, for each subset of banks, a bank access metric for tracking recency of access to that subset of banks, and control whether to switch a given subset of banks from the operational mode to the power saving mode depending on the bank access metric for the given subset of banks. Hence, subsets of banks accessed less recently can be more likely to be placed in the power saving state than subsets of banks accessed more recently. The power mode selection circuitry may switch a given subset of banks from the operational mode to the power saving mode in response to detecting that the bank access metric indicates no access to that subset of banks for at least a predetermined period.

In one example, the bank access metric can comprise a recency counter. Each subset of banks may have a separate recency counter. At periodic intervals, each recency counter may be advanced (e.g. incremented or decremented). When an access is made to a given subset of banks, the corresponding recency counter can be reset to an initial value. The power mode selection circuitry may switch a given subset of banks to the power saving mode when the corresponding recency counter reaches a threshold.

In some examples, in response to detecting an access to one subset of banks, the power mode selection circuitry may apply an adjustment to the bank access metric for another subset of banks. For example, with the recency counter example mentioned above, the recency counter for the other subset of banks could be adjusted by an adjustment amount, in the opposite direction to the direction in which the counter is advanced periodically, in response to detecting access to the first subset of banks. This recognises that there can be correlations between accesses to different banks, so by reducing the likelihood of powering down a given subset of banks when an access to another subset of banks is detected, this can increase the likelihood that on a subsequent correlated access to the given subset of banks, the given subset banks is ready to handle the access promptly, compared to the case where each subset of banks has its recency counter maintained solely based on accesses to that particular subset of banks.

The power mode selection circuitry may maintain a correlation metric tracking correlation between accesses to different subsets of banks, and determine based on the correlation metric a size of the adjustment applied to the bank access metric for the other subset of banks. Whether accesses to respective subsets of banks are actually correlated or not may be workload dependent, so a more accurate decision on whether it is beneficial to trigger a wakeup of a given subset of banks due to an access to another subset of banks can be made when considering a correlation metric which tracks inter-subset access correlation. For example, the correlation metric could be a measure of average time to an access in a different subset of banks after a first access to a given subset of banks. The correlation metric could be tracked specifically for certain pairs of banks, or could be tracked globally for all pairs of banks in general.

In some examples, the power mode selection circuitry may maintain an energy cost tracking metric indicative of an energy cost incurred in transitioning between the power saving mode and the operational mode in a previous window of time, and select a power saving mode usage pattern for a future window of time based on the energy cost tracking metric. This recognises that there is an energy cost to switching between the power saving mode and the operational mode. If, for a given workload, accesses to a given subset of banks keep being received shortly after entry to the power saving mode causing a wake up back to operational mode, the period in which the subset of banks remained in the power saving mode may be too short for the power savings in the power saving mode to outweigh the power costs associated with the power mode switching, so the use of the power saving mode may not have been beneficial. For other workloads with greater periods of inactivity for a given subset of banks, the power saving mode may provide a significant power saving. Therefore, by tracking energy cost of power mode transitions, a more informed decision on whether to use the power saving mode can be mode, helping to reduce overall power consumption depending on the workload involved.

For example, the power mode selection circuitry may test a plurality of different power saving mode usage patterns and obtain energy cost tracking metrics for each power saving mode usage pattern, and select for a future window of time one of the power saving mode usage patterns predicted based on the energy cost tracking metrics to provide lowest power consumption. For example, the different power saving mode usage patterns can differ in terms of the criteria for when the power saving mode is used (e.g. varying thresholds for deciding based on the recency counter whether to switch to power saving mode, or varying the size of the adjustments made to account for inter-bank-subset access correlation as mentioned earlier). One of the power saving mode usage patterns may comprise a pattern in which the power saving mode is not used at all. Hence, by testing different usage patterns and tracking the energy cost of each pattern based on observations of events during a previous window of time, the energy cost tracking metrics for each usage pattern can be compared to identify the usage pattern predicted to offer lowest power consumption for a future time window.

FIG. 1 schematically illustrates an example of an apparatus comprising one or more processors 4 and at least one cache 6, 10, 20. In this particular example, the apparatus is a multi-processor system comprising two or more processors 4, each of which could be for example a central processing unit (CPU), graphics processing unit (GPU), or neural processing unit (NPU—a specialized processor for processing machine learning workloads), etc. Each processor may have at least one private cache 6. While FIG. 1 for conciseness shows one private cache per processor, it will be appreciated that some processors may have more than one private cache, e.g. including caches for different purposes (e.g. data cache and instruction cache) and/or having a cache hierarchy with multiple levels of cache with varying capacities and access latencies so that a level 1 cache can provide faster access to a smaller subset of data while a level 2 or further level cache can provide slower access to a larger subset of data, but nevertheless all of the caches 6 provide faster access to cached data than if the corresponding data had to be loaded from memory 14. In some instances, a cluster 8 of processors 4 may have a shared cluster cache 10 which is accessible to processors 4 of that cluster 8, but is not accessible to processors 4 outside that cluster 8. It will be appreciated that the number of processors 4 shown in FIG. 1 is just one example, and that processors 4 could be homogenous or heterogeneous.

The processors 4 share access to shared memory 14. A shared unit 12 (e.g. part of a memory system interconnect) is provided to manage access to the shared memory 14 by the respective processors 4. The shared unit 12 has one or more requester interfaces 16 for receiving memory access requests and snoop responses from processors 4 or clusters 8 of processors and for transmitting memory access responses (e.g. read data and/or write acknowledgements) and snoop requests to the processors 4 or clusters 8. The shared unit 12 also has at least one memory interface 21 for issuing memory access requests to the memory system 14 and receiving responses to memory access requests from the memory system 14. While the memory system 14 is shown as a single entity in FIG. 1 associated with a single instance of a memory interface 21, it will be appreciated that in practice the memory system 14 may comprise a number of distinct memory storage units which may be associated with separate memory interfaces 21.

The shared unit 12 has coherency control circuitry 18 for managing coherency of cached data cached in any private caches 6 or cluster caches 10 of the respective processors 4 and clusters 8. A shared cache 20 associated with the shared unit 12 is shared for access by any of the clusters 8 or processors 4 whose coherency is managed by the coherency control circuitry 18, and acts as a last level cache, for which misses in the last level cache cause an access to main memory 14. A snoop filter 22 is provided for tracking which data addresses are cached at certain requesters (processors 4 or clusters 8). The snoop filter 22 can be used to reduce snoop traffic between the shared unit 12 and the requesters 4, 8 by allowing the coherency control circuitry 18 to determine when data for a given address is not cached at a particular requester 4, 8 and so a corresponding snoop request can be omitted for that address. The snoop filter 22 is not essential, and some embodiments may provide coherency control circuitry 18 which does not attempt to track the data cached at each requester. In this case, when one requester 4, 8 issues a read or write transaction to data which could be shared with other requesters, the coherency control circuitry 18 may trigger snoop transactions to be issued to each other requester which could have a cached copy of the data from the same address, and manage changes in coherency state at those other requesters and/or responses to the requesting requester (e.g. providing more up to date versions of the data as necessary). However, if there are a lot of requesters, then this approach of broadcasting snoops to all cached requesters can be complex and result in a large volume of coherency traffic being exchanged within the system 2. The snoop filter 22 can help filter out snoop requests being sent to requesters 4, 8 known not to be holding cached data for a given address. It is not essential for the snoop filter tracking to be precise, and so some imprecision in whether data is held in a cache 6, 10 of a given requester 4, 8 can be permitted provided that imprecision is restricted to causing false positive detection of data being cached when it is actually not cached—it is preferable to avoid false negative detections of data as not being cached when it is actually cached. By providing a snoop filter 22 which can at least partially track which addresses are cached at the respective requesters, this can help to reduce the volume of snoop traffic. In some examples the system cache 20 and snoop filter 22 may be combined, with a single storage structure looked up based on an address to provide both cached data and snoop filter information associated with that address. For example, snoop filter information may be stored alongside tag information of the shared cache 20.

As shown in FIG. 1, the shared cache 20 may comprise tag storage circuitry 26 and data storage circuitry 28. The data storage circuitry 28 stores cached data obtained from the memory system 14 (unless otherwise specified, "data" is intended to encompass instructions for execution by the processor 4). The tag storage circuitry 26 stores cache tags corresponding to the cached data. The cache tags provide address information corresponding to the cached data, for identifying which address corresponds to the data cached in a given entry of the data storage circuitry 28. The tag storage is used on a lookup to the cache 20 for determining whether there is a hit or miss in the cache 20 for a given address. While not explicitly shown in FIG. 1, other caches 6, 10 may similarly have tag storage 26 and data storage 28.

Figure 2:
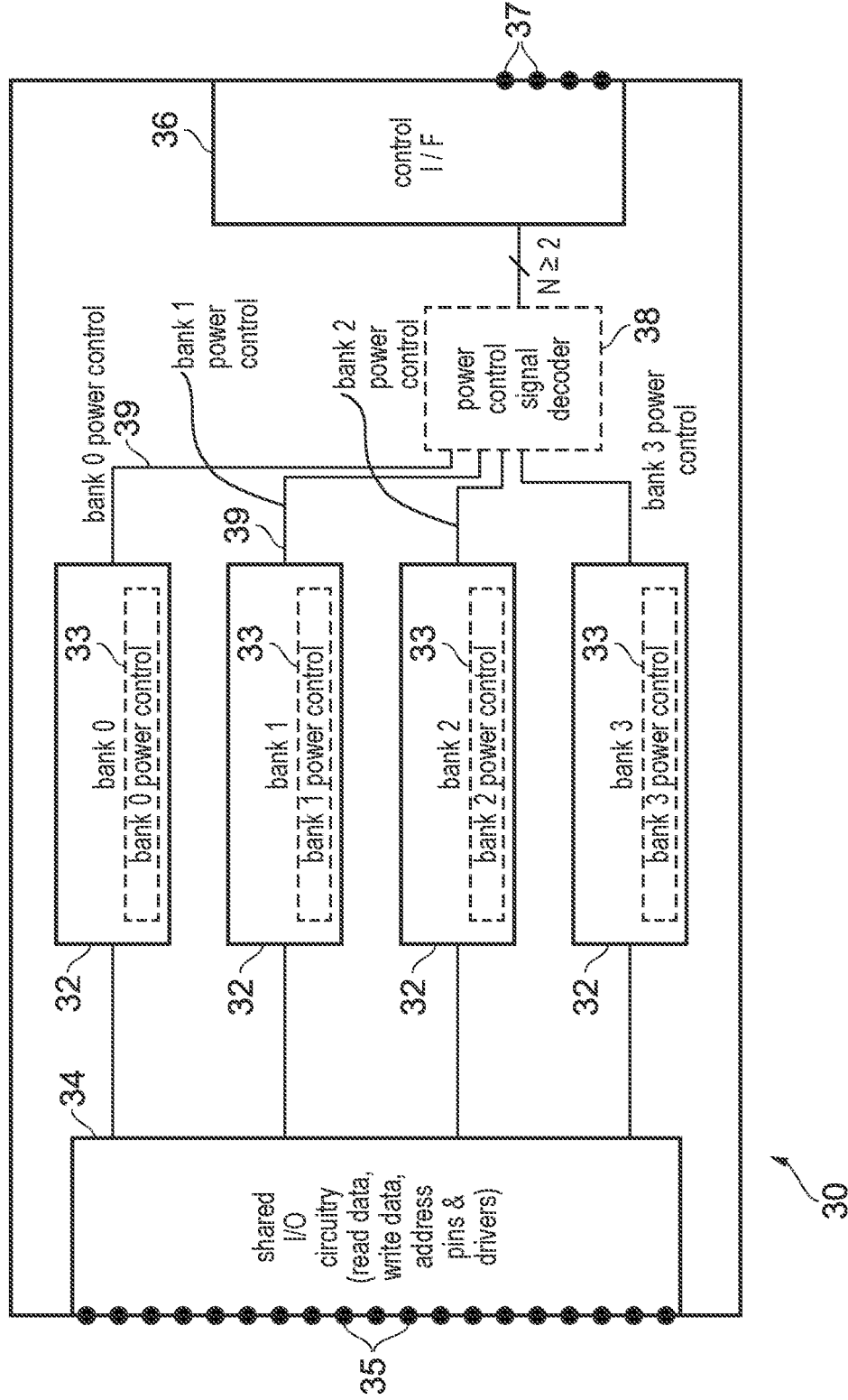
FIG. 2 illustrates an example of a memory instance.

In this particular example, the data storage circuitry 28 of the shared cache 20 within the shared unit 12 includes at least one memory instance 30 as shown in FIG. 2, and is associated with power control circuitry 24 external to the memory instance 30 (the power control circuitry 24 is shown in FIG. 1 and is described in more detail with respect to FIG. 6 described below).

As shown in FIG. 2, the memory instance 30 includes multiple banks 32 of storage cells, bank power control circuitry 33 (implemented in a distributed manner such that each bank 32 has a portion of the bank power control circuitry 33), shared input/output (I/O) circuitry 34, and a control interface 36. It will be appreciated that the memory instance could have many other components not explicitly shown in FIG. 2 (e.g. buffers for buffering requests or buffering read/write data, or arbitration circuitry for arbitrating between requests).

The shared I/O circuitry 34 has various pins 35 for exchanging access requests and responses, read data, write data, addresses etc. with external circuitry outside the memory instance. The shared I/O circuitry 34 may also include write drivers and/or address drivers for driving internal signal lines within the memory instance based on write data and/or addresses received from the external circuitry and read drivers for driving signal lines to the external circuitry based on data read from the banks 32. While the shared I/O circuitry 34 and pins 35 are shown all on one side of the memory instance in the schematic of FIG. 2, it will be appreciated that the shared I/O circuitry 34 and pins 35 may in practice be distributed around the boundary of the memory instance 30.

Each bank 32 comprises an array of storage cells for storing data values, and supports multiple modes of operation including at least an operational mode in which the storage cells are both readable and writable, a power saving mode in which data values stored in the cells are retained but the storage cells are not readable or writable, and a power off mode in which storage cells are not readable or writable and retention of data values in the storage cells cannot be guaranteed. In the power saving mode, power consumption is reduced compared to the operational mode. In the power off mode, power consumption is reduced compared to the power saving mode. A transition from the power saving mode to the operational mode is faster than a transition from the power off mode to the operational mode.

The control interface 36 has a number of power control signal paths 37 (e.g. pins) for receiving power control signals for controlling use of the power saving mode by the respective banks 32. Based on the power control signals received at the control interface 36, the bank power control circuitry 33 individually controls, for each of two or more subsets of banks 32 of storage cells within the same memory instance 30, whether that subset of banks is in the power saving mode. Hence, for at least one setting of the power control signals, one subset of banks can be placed in the power saving mode while another subset of banks may remain in the operational mode.

The power control signals received at the control interface 36 could be encoded in different ways. One approach may use an encoding with one bit (or one group of two or more bits) per subset of banks, so that no internal decoding logic is needed to identify which subsets of banks should be placed in the power saving mode. It is also possible to use a more compact encoding where a set of bits collectively represents which combination of subsets of banks is to be placed in the power saving mode but there is not a separate bit or subset of bits per bank subset. In this case, an internal power control signal decoder 38 may generate internal bank power control signals 39 to each bank which control the corresponding portion of the bank power control circuitry 33 to individually control which subsets of banks 32 are in the power saving mode.

Note that the encoding of the power control signals received on the control interface 36 means that there is the ability to control, in a programmable manner, of whether each subset of banks operates in the power saving mode for an ongoing period (not just a transient period while the memory instance as a whole is switched between power modes). This is different to an approach where the externally provided signals specify a power mode for the memory instance as a whole, but some internal circuitry is provided to stagger the timing at which respective banks wake up from power saving mode to operational mode, so that for a transient period during the wake up (when no memory accesses are yet being serviced) some banks may be in power saving state while others are in operational state. In this comparative approach, once the memory instance as a whole is operational then even if isolated banks are not being accessed they would still remain in the operational state as there would be no ability for external circuitry to individually program subsets of banks to remain in the power saving state while other banks are operational. By providing the external encoding capability to specify individual subsets of banks with independent power modes, this means the finer granularity of control influences the power modes used not only during a short transient switching period, but also during long term use of the memory instance to service memory accesses, enabling greater opportunities for power savings when certain subsets of banks are not being accessed.

Figure 3:
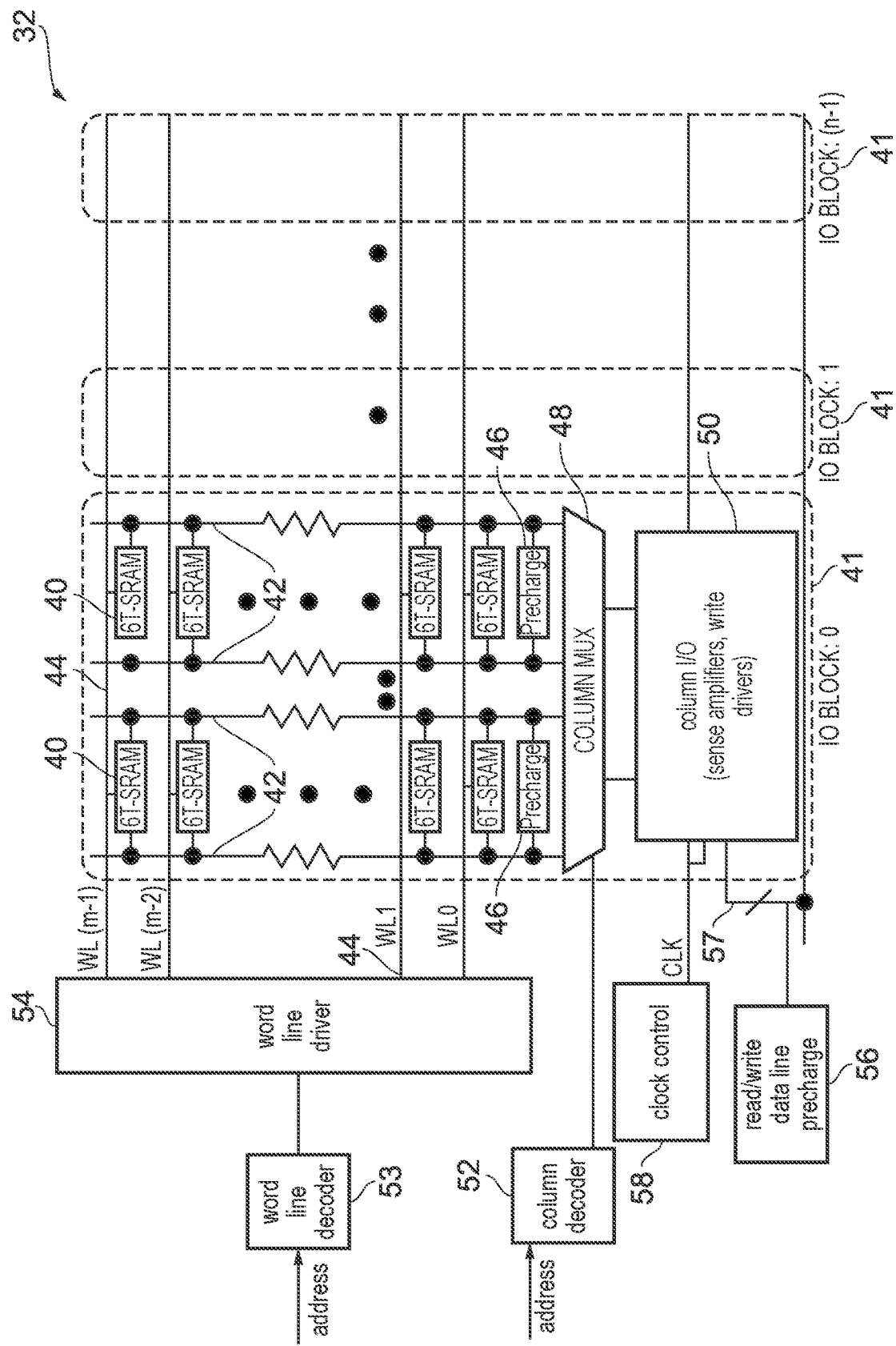
FIG. 3 illustrates an example of a bank of storage cells.

FIG. 3 illustrates an example of one of the banks 32 in more detail. The bank 32 comprises a number of I/O blocks 41 each comprising a number of columns of storage cells 40. For an n-bit value to be stored in the bank 32, one bit of that value is stored in the storage cells 40 at corresponding row/column positions in each of the n I/O blocks 41.

Each storage cell 40 in this example has a six-transistor (6T) static random access memory (SRAM) design, but it will be appreciated that other storage cell designs are possible. Storage cells within the same column are coupled between a corresponding pair of bit lines 42 for that column, which are used differentially to indicate whether a bit read from a storage cell 42 is 1 or 0 or whether a bit written to a storage cell 42 is 1 or 0 (the 1 or 0 encodings depending on which of the pair of bitlines 42 is high and which is low). Storage cells 40 within the same row of the array structure share a word line 44. The set of word lines 44 coupled to each row of the structure are used to select which cell to read/write in a given column. Each column of storage cells has bitline precharge circuitry 46 for precharging the bitlines 42 in that column to logic-high (logic-1) shortly before a read or write operation is performed.

Each I/O block 41 has a column multiplexer 48 for selecting between the bit lines of respective columns in the same I/O block 41, and column I/O circuitry 50 comprising sense amplifiers for sensing bit values read on the bitlines 42 coupled to a cell 40 in that I/O block and write drivers for driving the bitlines.

Shared between the respective I/O blocks 41 are a column decoder 52 which controls the column multiplexers 48 of each I/O block 41 to select the specific column to be read/written based on decoding of a read/write address identifying the target value to be read/written, a word line decoder 53 which decodes the read/write address to identify which row of the array structure contains the target storage cells 40 to be read/written, and a word line driver 54 to drive word line signals on the word lines 44 based on the decoding by word line decoder 53, so that the word line for the row including the target storage cells 40 to be read/written is driven to the opposite state (logic high or low) from word lines for non-selected rows not including the target storage cells 40. Read/write data line precharge circuitry 56 is also provided for precharging read/write data lines 57 used to transmit read data and write data between the column I/O circuitry 50 and the shared I/O circuitry 35. Clock control circuitry 58 generates internal clock signals for controlling timings of operations within the bank 32.

Hence, for a read operation, the word line decoder 53 controls the word line driver 54 to drive the word line corresponding to a particular row to the opposite state from other rows, and the column decoder 52 controls the column multiplexers 48 to select the pair of bitlines 42 for a particular column (a correspondingly positioned column is selected in each I/O block 41). At a timing controlled by the clock control circuitry 58, prior to the actual read operation starting, the precharge circuitry 46 in the selected column precharges the bitlines 42 of that column to logic high and the read/write data line precharge circuitry 56 precharges read data lines to logic high. The word line driven by word line driver 54 based on the word line decoding causes the storage cells 40 in that row to be coupled to the bitlines 42 (with cells 40 in other rows being isolated form the bitlines 42 due to their wordlines 44 being set to the opposite state from the wordline in the selected row), causing one of the bitlines to drop to logic low. Which bitline drops to logic low depends on the stored state in the storage cell 40 at the intersection of the selected row and selected column. While bitlines in multiple columns may change state, the column multiplexer 48 selects the relevant column's output and couples these to sense amplifiers in the column I/O circuitry 50 for each I/O block 41 which detect which bit line has dropped to logic low in each I/O block, and output a set of read data (1 bit from each I/O block 41) on the read data lines 57 for read out to external circuitry via the shared I/O circuitry 35.

For a write operation, the row/column decoding and precharge operations are similar to reads, but this time instead of sensing values from the bitlines 42 in the selected column, the write drivers in the column I/O circuitry 50 of each I/O block drive the pair of bitlines 42 in the column selected by column multiplexer 48 with differential values (a first of the pair of bitlines being logic high and the second pair of bitlines being logic low when the bit to be written is binary 1, and vice versa for binary 0) based on write data obtained from the write data lines 57 (a respective bit of the write data being written by each of the I/O blocks 41). The driving of the word line 44 in the selected row and the column multiplexing 48 for selecting the selected column means that only the cells 40 at the selected row/column intersection are coupled to the bitlines 42 driven by the write drivers, and so an n-bit value (1 bit per I/O block 41) is written to a set of n storage cells 40 in corresponding columns (and same row) of different I/O blocks 41.

It will be appreciated that this is just one example of a possible memory bank structure and other examples could also be provided.

The circuitry associated with a particular bank 32 of storage cells 40 may provide a number of opportunities for power saving at times when there are no active read or write request to that bank, but the data stored in the storage cells 40 of the bank still needs to be retained. The power saving mode described above may use any one or more of these various options for reducing power consumption.

Figure 4:
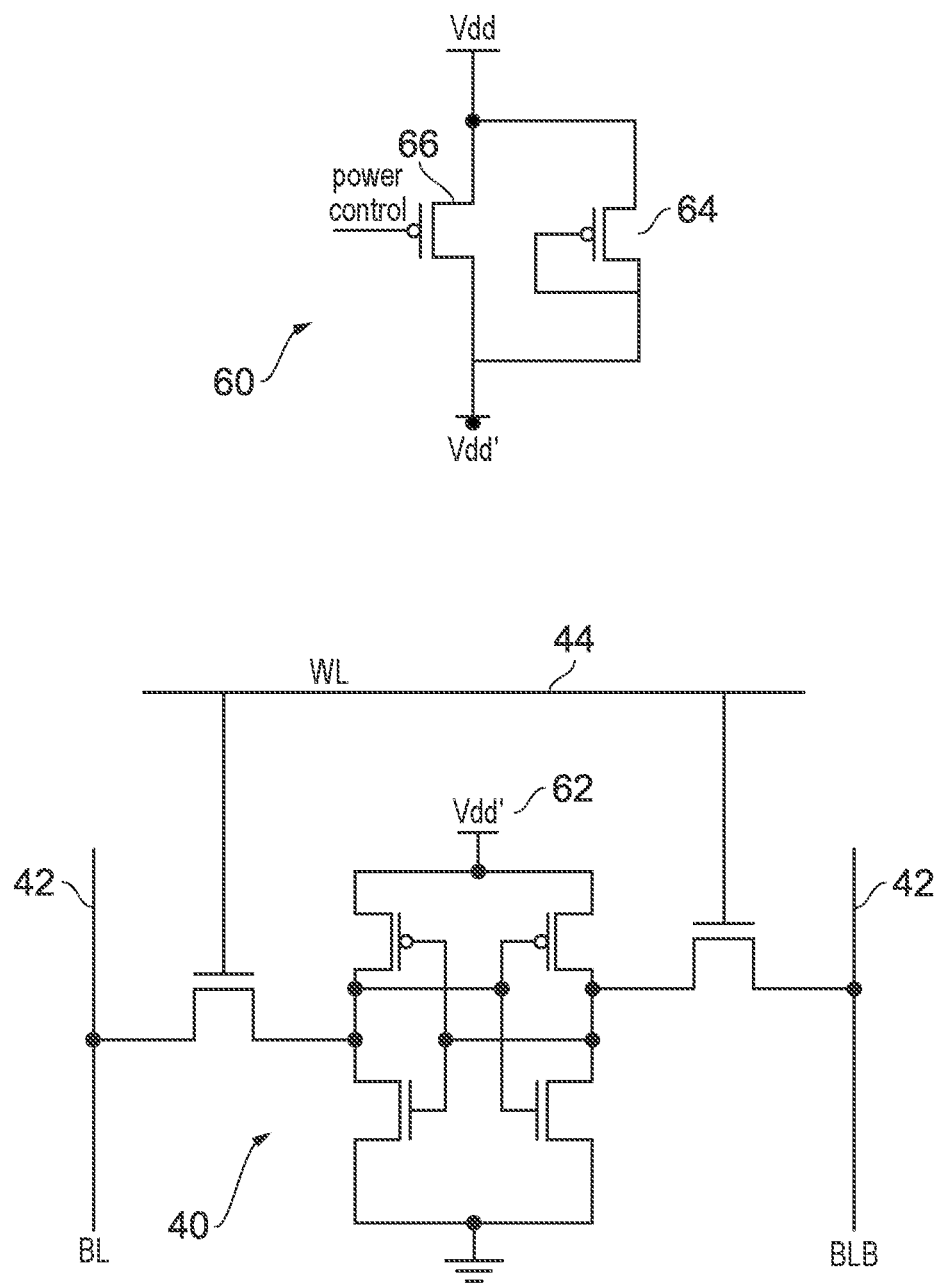
FIG. 4 illustrates an example of a storage cell and circuitry to reduce a supply voltage to the storage cell.

FIG. 4 illustrates a first option for saving power. In this example, a supply voltage Vdd' to the storage cell 40 can be reduced in the power saving mode by using power gating circuitry 60 provided on the path between the supply voltage node Vdd and the storage cell 40. Again, FIG. 4 is based on a 6T SRAM cell design, comprising a pair of cross-coupled inverters (4 of the 6 transistors) and two access transistors. The cross-coupled inverters are bistable—they are in one of two states, one corresponding to logic high on bitline BL and logic low on bitline BLB and the other corresponding to logic low on bitline BL and logic high on bitline BLB. The cross-coupled inverters can be flipped from one state or another by driving one of the bitlines 42 high and the other of the bitlines 42 low during a write operation. The two access transistors are for selecting, based on the word line signal on the word line 44 for the corresponding row of cells, whether the cross-coupled inverters are isolated from the bitlines 42 or coupled to the bitlines 42. It will be appreciated that other cell designs are also possible.

In this example, the four transistors of the cross-coupled inverters are coupled between an effective supply voltage node Vdd' and a ground voltage node. The effective supply voltage Vdd' is coupled to the actual voltage supply Vdd via the power gating circuitry 60. Vdd' is set to the supply voltage level Vdd during the operational mode, but it is possible to reduce Vdd' to a retention voltage level (at a margin below Vdd) without losing the internal state of the cross-coupled inverters. The power gating circuitry 60 in this example comprises a diode connected transistor 64 coupled between Vdd and Vdd'. The diode connected transistor 64 has its gate terminal coupled to its drain terminal, and so will provide a voltage drop across the diode connected transistor 64, causing Vdd' to drop lower than Vdd when there is no bypass path available for bypassing diode connected transistor 64. A power control transistor 66 is provided in parallel with the diode connected transistor 64, so that when the power control transistor 66 is in a substantially conductive state, the power control transistor 66 short circuits the diode connected transistor 64 and so the effective supply voltage Vdd' to the storage cell 40 is Vdd itself, while when the power control transistor 66 is shut off to be in a substantially non-conductive state (subject to leakage effects), the diodes connected transistor 64 provides the main conduction path from Vdd to Vdd' and so Vdd' drops to the retention voltage by a margin corresponding to the threshold voltage of the diode connected transistor 64. By lowering the supply voltage 62 to the storage cell, leakage in the storage cells 40 (which tends to be proportional to the voltage difference across the transistors of the storage cells 40) can be reduced, reducing static power consumption. Hence, in one example, in the operational mode, the power control transistor 66 is made conductive, and in the power saving mode the power control transistor 66 is made non-conductive (subject to leakage effects) to cause lower static power consumption in the cells supplied by the corresponding supply voltage 62 than in the operational mode.

It will be appreciated that this is just one way in which the supply voltage to a cells 40 in a given bank 32 could be reduced while still maintaining the supply voltage at a level sufficient to retain the stored state, and other examples are also possible.

In contrast, for the power off mode, voltages supplied to the storage cells 40 can be reduced further to a level such that retention of the stored data values cannot be guaranteed (e.g. by fully isolating the Vdd' node from the Vdd supply note, for instance by including a cutoff transistor in series with the parallel transistors 64, 66 which is switched off in the power off mode).

Similar power gating techniques can be used to disable various control components of the bank 32, such as the word line decoder 53, word line driver 54 or clock control circuitry 58. Also, precharging of the bitlines 42 or read/write data lines 57 by the precharge circuitry 46 and read/write data line precharge circuitry 56 respectively can be disabled. For example, disabling these components could be implemented by including isolation transistors on the path supplying a supply voltage to these components, which can selectively be made more or less conductive depending on whether the bank 32 is in the operational mode or power saving mode. In the case of the precharge components 46, 56, another option is to implement a diode-connected transistor similar to the transistor 64 shown for the storage cells 40, to reduce the precharge supply level compared to the operational mode, but not fully shut off the voltage supply to the precharge circuitry. Partially reducing, but not fully turning off, the precharge voltage can be helpful for reducing wake up time when switching from power saving mode to operational mode, as nodes in the precharge circuitry 46, 56 may take less time to charge to the levels used in the operational mode.

Hence, in general there are numerous techniques that could be used to save power in the power saving mode, and any one or more of these techniques can be used individually or in combination during the power saving mode implemented for a given memory instance.

As noted above, the power control signals received on the control interface 36 are encoded to enable separate specification of which power saving mode should be used for each subset of banks 32.

Figure 5:
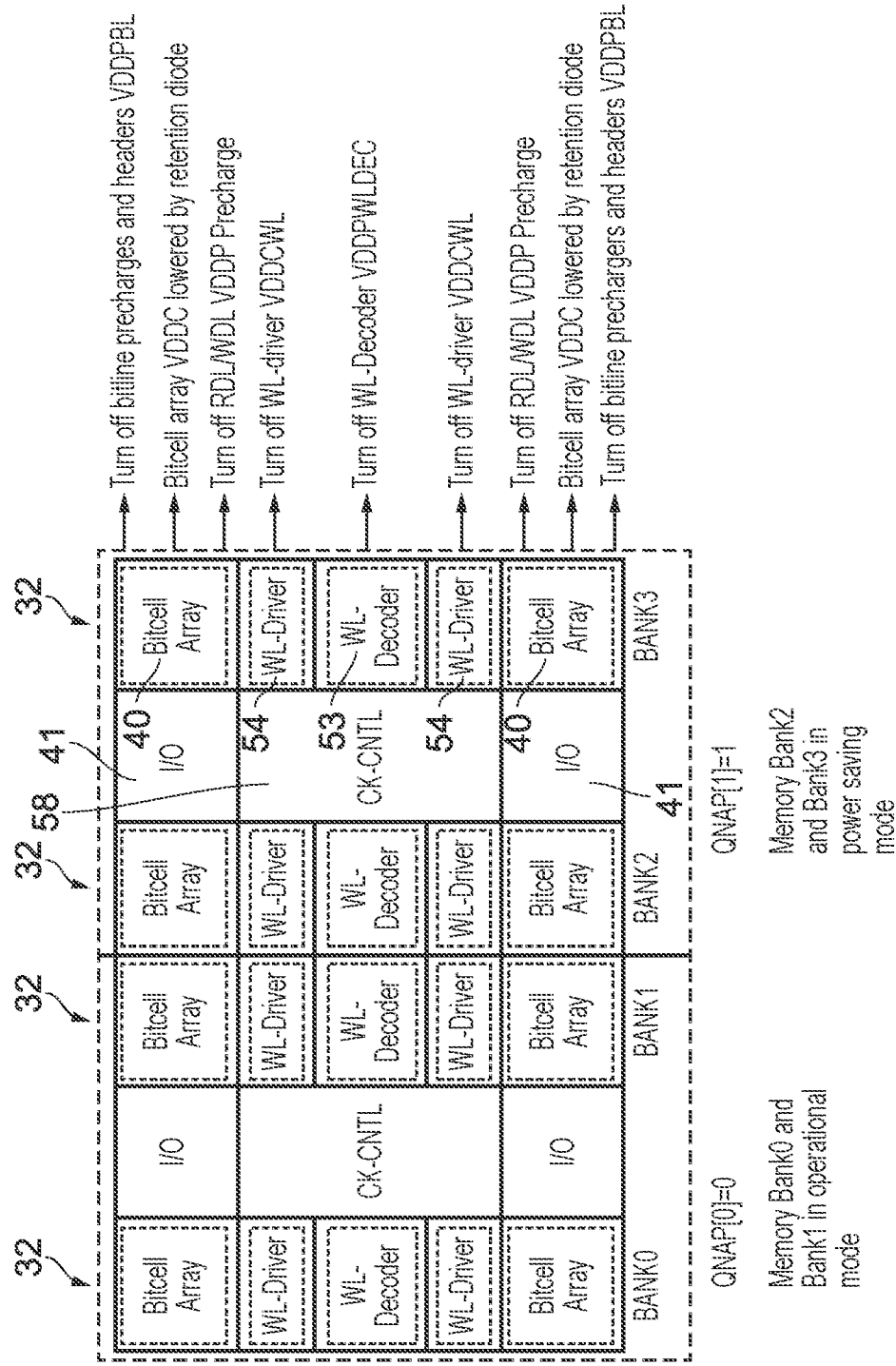
FIG. 5 illustrates an example where use of the power saving mode is controlled at granularity of subsets of banks within the same memory instance.

For example, FIG. 5 shows a memory instance comprising four banks 32, treated as two subsets: a first subset comprising banks 0 and 1 and a second subset comprising banks 2 and 3. Hence, separate signals QNAP[0] and QNAP[1] (QNAP being short for "quick nap") are used to control whether the respective subsets are in operational mode or power saving mode (quick nap mode). The QNAP signals shown could either be the power control signals received at the control interface 36, or could be internal power control signals 39 decoded by the power control signal decoder 38 from the power control signals received at the control interface 36. In the example of FIG. 5, the QNAP signals are currently set to indicate that subset 0 (banks 0 and 1) should be in the operational mode, while subset 2 (banks 2 and 3) should be in the power saving mode. Hence, even if there are ongoing accesses to bank 0 or bank 1, power can be saved by placing inactive banks in subset 1 in the power saving mode.

In this particular example, in the power saving mode, the bitline precharge circuitry 46 is disabled (including isolating it fully or partially from its voltage headers), the retention diode 64 is used to lower the supply voltage to the bitcells 40, the read/write data line precharge circuitry 56 is disabled, the word line driver 54 is disabled, and the word line decoder 53 is disabled. Other examples could implement a different combination of power saving mechanisms in the power saving mode.

While FIG. 5 shows an example where each subset comprises two banks 32, other examples may control use of the power saving mode at a different granularity of banks 32 within a memory instance 30. For example, some implementations may provide individual power saving control for each separate bank, so that each subset comprises a single bank 32. Other implementations may divide the banks into subsets comprising a number of banks other than two. Some examples may have the same number of banks in each subset. However, it is not essential for each subset to comprise the same number of banks, and some examples may have asymmetric subsets comprising different numbers of banks.

Figure 6:
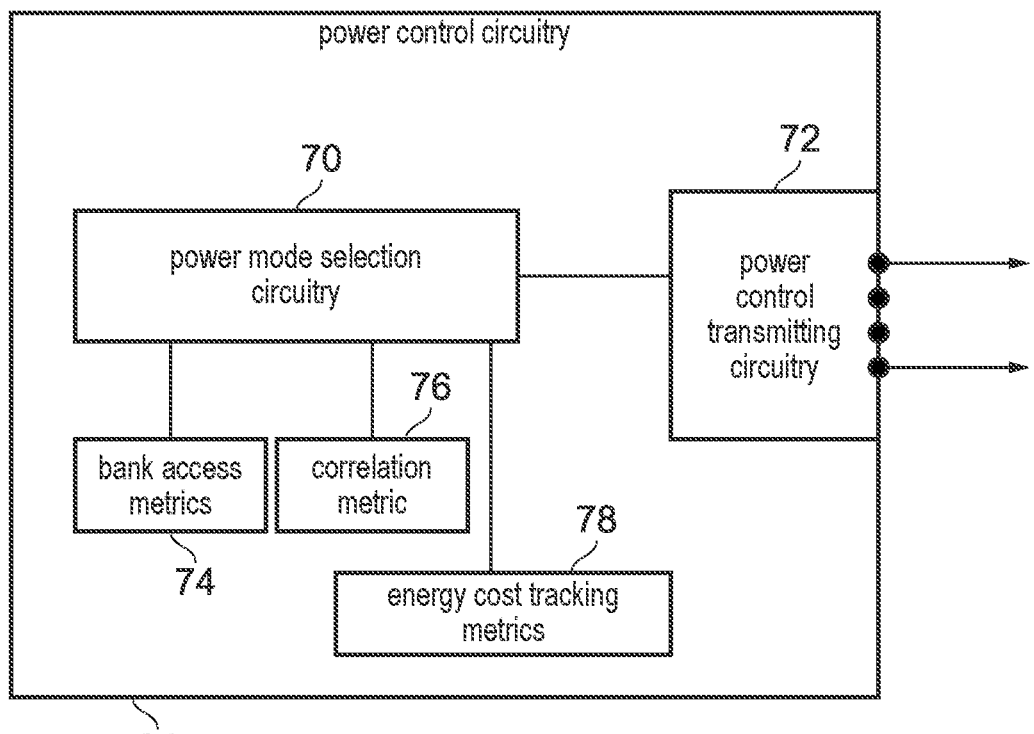
FIG. 6 illustrates an example of power control circuitry.

FIG. 6 illustrates an example of the power control circuitry 24 which controls power mode selection for the banks 32 within the memory instance 30, and generates the power control signals transmitted to the control interface 36 of the memory instance 30. The power control circuitry 24 comprises power mode selection circuitry 70 which monitors patterns of memory accesses to the memory instance 30 and, based on the monitoring, selects which power mode should be the selected power mode for each subset of banks 32 within the memory instance 30. The power mode selection circuitry 70 controls power control transmitting circuitry 72 to transmit the power control signals to the memory instance 30, with the power control signals having an encoding set by the power mode selection circuitry which indicates which power mode is the selected power mode for each subset of banks 32.

As shown in FIG. 6, the power mode selection circuitry 70 may maintain a number of monitoring metrics based on monitored access request patterns and power mode transitions associated with the memory instance 30. For example, the metrics may include:

bank access metrics 74 for tracking recency of access to each subset of banks 32, which can be used to determine whether to switch a subset of banks from operational mode to power saving mode;

one or more correlation metrics 76 for tracking the extent to which an access to a first bank may be correlated with a previous access to a second bank, which can be helpful for assessing whether accesses to one bank should prevent another bank switching to power saving mode or cause a bank already in power saving mode to wake up to operational mode; and/or energy costs tracking metrics 78 for tracking the predicted energy costs associated with transitions of bank subsets between the power saving mode and the operational mode, which can be used to predict which usage regime for the power saving mode may be likely to provide greatest power savings in future.

Use of these metrics as discussed in more detail below.

Figure 7:
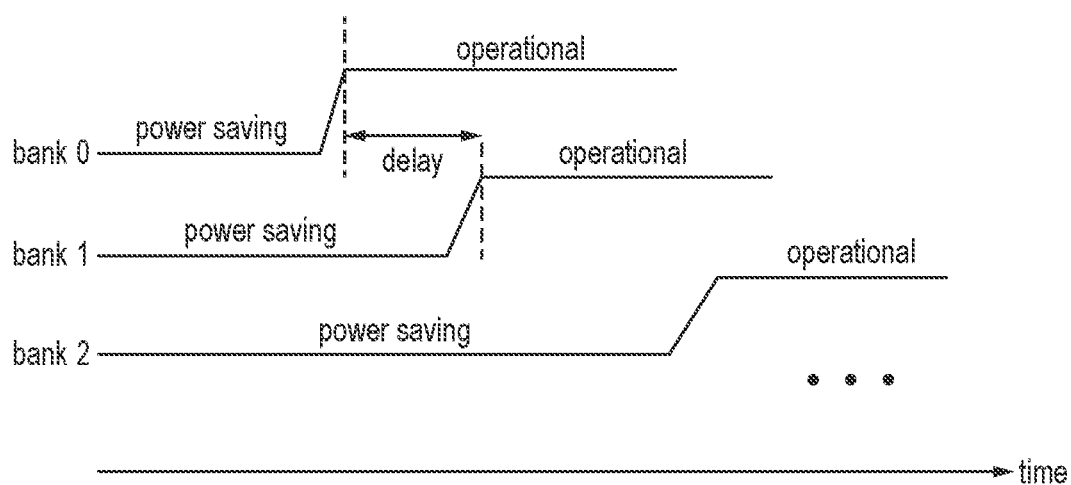
FIG. 7 illustrates an example of staggering transitions of banks from the power saving mode to the operational mode.

One consideration when waking up subsets of banks from the power saving mode to the operational mode may be to maintain a limit on the inrush current which arises due to intermediate nodes within the memory instance 30 becoming charged due to an increase in supply voltage. If the inrush current is too large, then this may cause voltage levels to droop in other portions of the system sharing the same voltage supply, which could cause errors in operation of those other portions, so it can be desirable to maintain inrush current within certain limits. As shown in FIG. 7, one technique for reducing the peak inrush current can be to stagger switching of subsets of banks from power saving mode to operational mode so that there is a delay between switching one subset to the operational mode and switching another subset to the operational mode (in the example of FIG. 7, each subset comprises a single bank). By including delays between waking up individual subsets of banks within the same memory instance, the total inrush current can be reduced compared to memory instances which power up all banks together, and so this makes it possible to have lower leakage memory instances for a given amount of power supply. The delay between waking up one subset of banks and another could be fixed (e.g. based on hardwired circuit logic which implements a certain amount of delay), or could be programmable (based on circuit logic which is able to select variable delay elements depending on the programming configuration input). In cases where there are multiple memory instances being controlled by the same power control circuitry 24, there may also be similar delays between waking up banks in one memory instance and waking up banks and another memory instance, and the intra-memory-instance wakeup delay between waking up a first bank subset of a given memory instance and waking up a second bank subset in that same given memory instance could be either the same or different to the inter-memory-instance wakeup delay between waking up a first bank subset of one memory instance and waking up a second bank subset in a different memory instance.

In general, for a given subset of banks 32 within a given memory instance 30, when the subset of banks 32 is currently in the power saving mode, the power mode selection circuitry 70 monitors for an indication that a memory access request is imminent for that given subset of banks 32. The trigger for detecting that a memory access request is required for that subset of banks 32 could vary depending on implementation choice. For example, the address of an incoming memory access request could be decoded at the point when it reaches the interconnect (shared unit 12) to detect whether the address maps to a subset of banks in the power saving mode, and this could be used to detect that the subset of banks should be woken up (subject to any delays for inrush current reduction that may be applied if a previous subset of banks has recently been woken up).

However, in practice, where the memory instance 30 is used as a cache 20, it can be convenient to trigger the wake up of a given subset of banks in response to detecting that a tag access request has been made, or is being made, to the tag storage circuitry 26 for performing a tag lookup for an address corresponding to a subset of banks currently in the power saving mode. The wakeup time associated with bringing the subset of banks into the operational mode after being instructed to switch from power saving mode may be commensurate with the typical delay between a tag access and the corresponding data access, and so there may not be any need to trigger the power mode transition any earlier than the time of the tag access being made. If necessary, the "tag-to-data" warmup delay implemented between the timing of the tag access and the timing of the corresponding data access could be extended to allow for the warmup time for switching from power saving mode to operational mode. This tag-to-data warmup delay could be fixed or could be programmable in some designs. A shorter tag-to-data warmup delay has an advantage of improving performance because data becomes accessible sooner for each access, while a longer tag-to-data warmup delay has an advantage of supporting a more gradual wake up from power saving mode to operational mode (e.g. allowing different components of the bank 32 to have longer delays between their wake up timings) which can allow inrush current to be reduced further to provide lower leakage.

Figure 8:
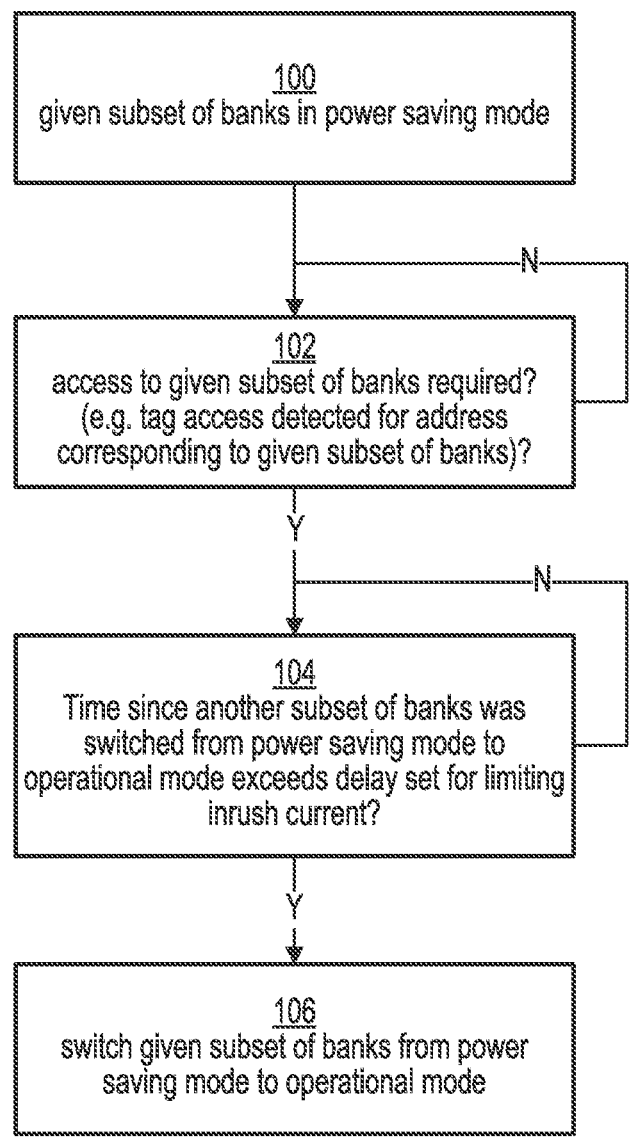
FIG. 8 illustrates a method of controlling switching of a subset of banks from the power saving mode to the operational mode.

FIG. 8 is a flow diagram illustrating switching of a given subset of banks from the power saving mode to the operational mode. At step 100, the given subset of banks is currently operating in the power saving mode. At step 102, the power mode selection circuitry 70 detects whether access to the given subset of banks is required. For example, this can be detected based on a tag access request requesting a tag lookup for an address corresponding to the given subset of banks reaching a certain stage of processing of tag access requests (e.g. the tag access request being issued to the tag storage 26, being allocated to a tag access request queue, or otherwise reaching a certain stage of a tag access processing pipeline). If no access to the given subset of banks is required then the given subset of banks 32 remains in the power saving mode.

When access to the given subset of banks 32 is detected as being required, then at step 104 the power saving mode selection circuitry 70 detects whether the time that has elapsed since another subset of banks 32 was switched from the power saving mode to the operational mode exceeds a delay set for limiting inrush current. If another subset of banks 32 has recently switched to the operational mode and so this delay time has not yet been exceeded, then the timing of switching the given subset of banks to the operational mode is delayed until the delay time has been exceeded. Once the time since the other subset of banks was switched to operational mode exceeds the set delay time, at step 106 the power mode selection circuitry 70 changes the encoding of the power control signals (transmitted over the power control transmitting circuitry 72 to the control interface 36 of the memory instance 30) to indicate that the given subset of banks should be switched from the power saving mode to the operational mode.

Once a given subset of banks is in the operational mode, the power mode selection circuitry 70 decides when to switch that subset of banks back to the power saving mode, based on monitoring of accesses to that subset of banks (and possibly also based on accesses to other banks). For example, each subset of banks may have a corresponding bank access metric which tracks recency of accesses to that subset of banks. For example, each subset of banks may have a recency counter which is advanced (incremented or decremented) at periodic intervals, and is reset to an initial value in response to detecting access to that subset of banks. A comparison of the recency counter for a given subset of banks with a certain threshold can be used to determine whether to switch the subset of banks from the operational mode to the power saving mode, depending on whether there have been any recent accesses to that bank within a certain period (where that period corresponds to the threshold set for the comparison).

Figure 9:
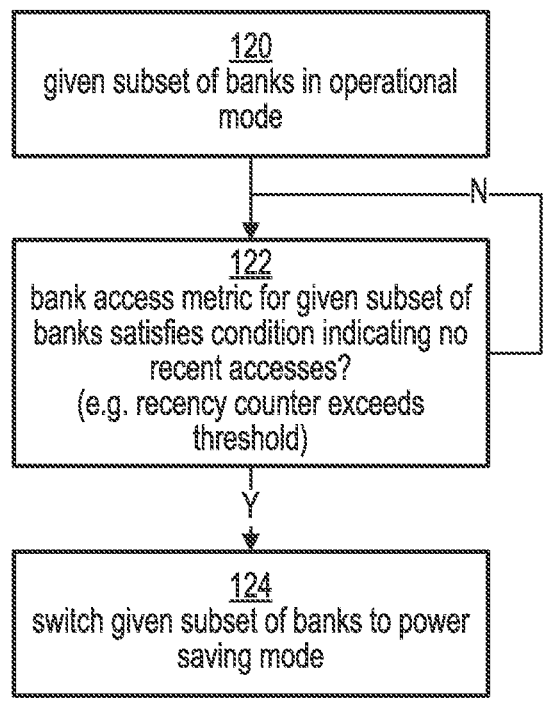
FIG. 9 illustrates a method of controlling switching of a subset of banks from the operational mode to the power saving mode.

Hence, FIG. 9 shows a flow diagram of making the decision on whether to switch to power saving mode. At step 120, a given subset of banks 32 is currently in the operational mode. At step 122, the power control selection circuitry 72 determines whether the bank access metric 74 satisfies a condition indicating that there are no recent accesses to the given subset of banks. For example, the power control selection circuitry 72 may determine whether a recency counter corresponding to that subset of banks exceeds a given threshold. The recency counter may be considered to exceed the threshold either if it is greater than the threshold (in an implementation where the reset value is a minimum value of the counter and the counter is incremented at elapse of each periodic interval), or if it is less than the threshold (in an implementation where the reset value is a maximum value of the counter and the counter is decremented at elapse of each periodic interval). If the bank access metric 74 for the given subset of banks satisfies the condition, then at step 124 the power mode selection circuitry 70 changes the encoding of the power control signals transmitted to the memory instance 30, to indicate that the given subset of banks should be switched from the operational mode to the power saving mode.

Figure 10:
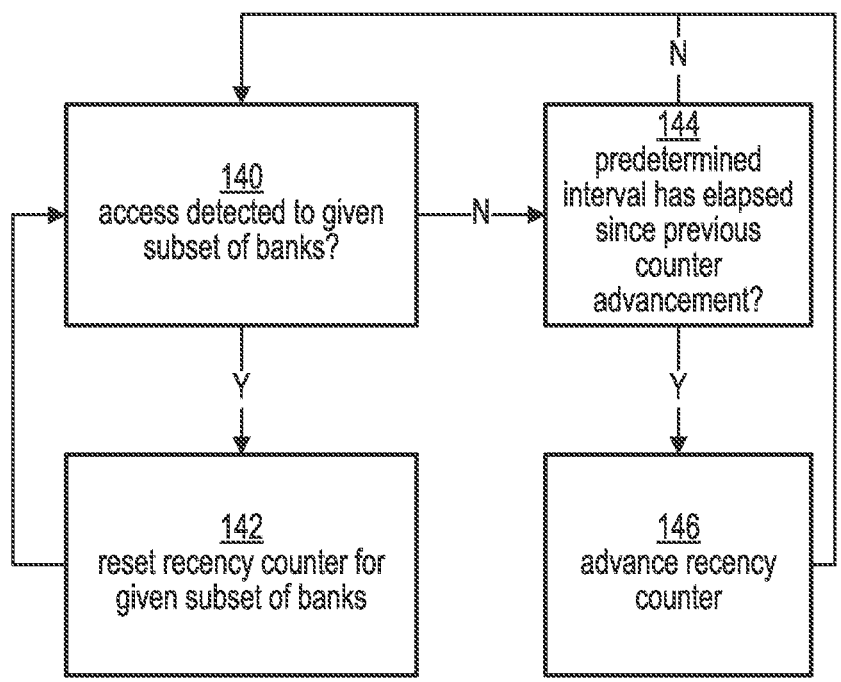
FIGS. 10 and 11 illustrate examples of methods for maintaining a recency counter used to determine whether to switch a given subset of banks to the power saving mode.

FIG. 10 is a flow diagram showing a first example of maintaining the bank access metric 74 for a given subset of banks. In this example, a recency counter is used as the bank access metric and that recency counter is maintained based on accesses to the given subset of banks, independent of access to other subsets of banks. At step 140, the power mode selection circuitry 70 detects whether an access request has been detected to an address corresponding to the given subset of banks (this access could be detected based on the corresponding tag access or based on the data storage access-hence the timing of detecting that there is an access to an address in the relevant subset of banks could vary). If an access to the given subset of banks is detected, then at step 142 the power mode selection circuitry 70 resets the recency counter for the given subset banks to an initial value (e.g. a minimum or maximum value of the counter, depending on whether the advancement direction of the counter is an increment towards the maximum value or a decrement towards the minimum value). If no access has been detected to the given subset of banks, and at step 144 it is determined that a predetermined interval has elapsed since the previous counter advancement, then at step 146 the recency counter is advanced to a subsequent value (e.g. incremented or decremented). The amount of the increment/decrement could be by 1 or at intervals of some other advancement amount. For some workloads, with relatively little correlation between accesses to one subset of banks and accesses to another subset of banks, this approach may work well.

However, other workloads may have more correlated access patterns to addresses in different banks, where for example an access to an address in a second subset of banks tends to follow relatively shortly after an access to an address in a first subset of banks. In this case, it may be desirable to implement a scheme where an access to one subset of banks may cause another subset of banks to stay awake a little longer even if there have been no accesses to that other subset of banks in a recent period, as if the access to that other subset of banks will follow shortly after, that access will be handled more promptly (and the power cost of the transition in and out of the power saving mode can be avoided) if that other subset of banks had not been powered down to power saving mode yet.

Therefore, another scheme can be that the recency counters for a given subset of banks may also be adjusted when an access is detected for another subset of banks. For example, the recency counter for a given subset of banks may be adjusted in the opposite direction to the advancement direction (e.g. reduced, in the case where the advancement direction is the increment direction), when an access to another subset of banks is detected. The adjustment amount could be fixed or could be variable depending on a correlation metric 76 used to track the amount of correlation between accesses in different subsets of banks. For example, the correlation metric 76 could be a measure of the average time between a first access to a first subset of banks after previously accessing another subset of banks and the next access to a different subset of banks other than the first subset of banks. This correlation metric 76 could be tracked globally for all pairs of banks in common (e.g. calculating the average over any pair of requests to different subsets of banks, regardless of which specific subsets of banks is accessed), or could be maintained specifically for certain pairs of banks. The correlation metric 76 could also be used for other purposes (e.g. deciding for a subset of banks currently in power saving mode whether to switch to operational mode when an access is detected to a different subset of banks).

Figure 11:
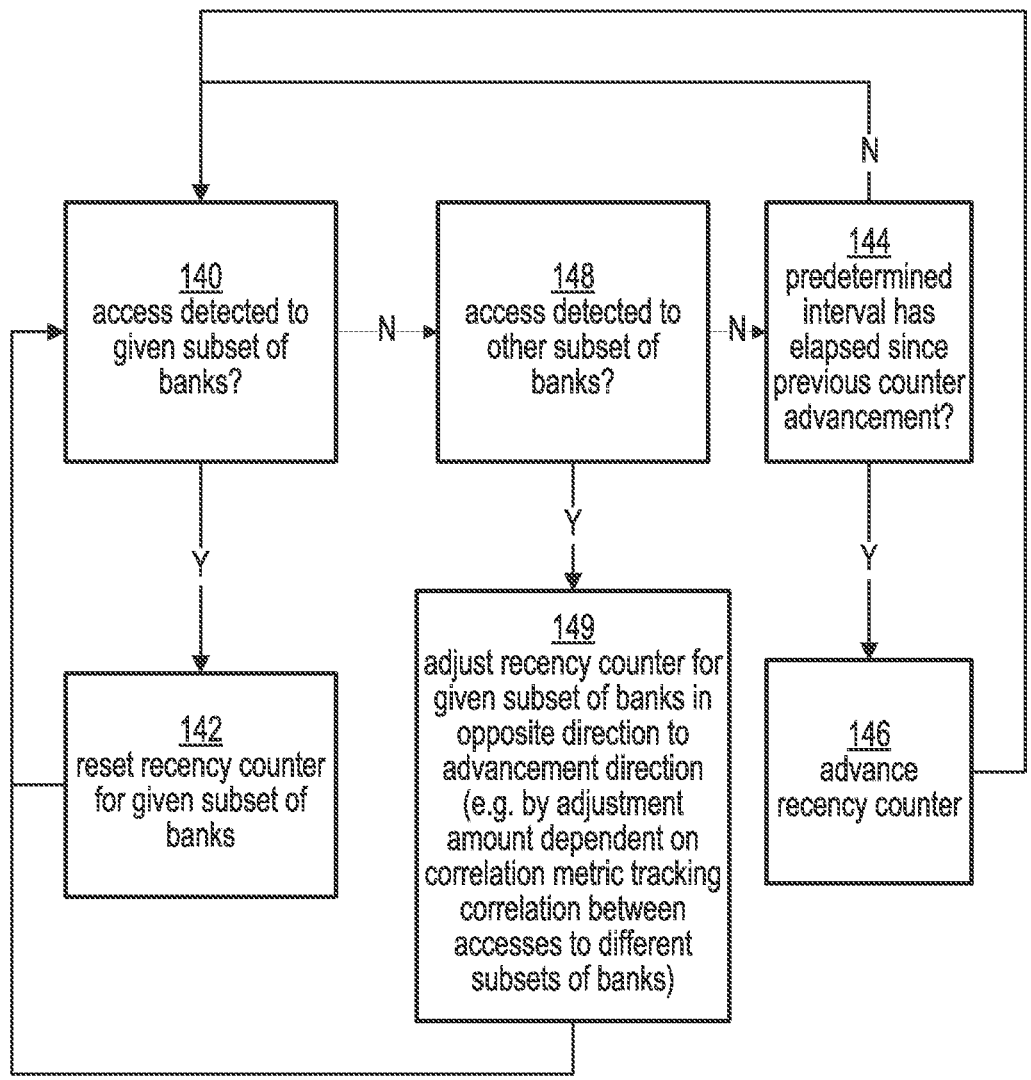

Hence, FIG. 11 illustrates a method of maintaining the bank access metric 74 for a given subset of banks to take account of accesses to different subsets of banks. Steps 140, 142, 144, 146 are the same as in FIG. 10. However, an additional step 148 is provided to detect whether an access is detected to another subset of banks other than the given subset of banks, and if such an access is detected, then at step 149 the recency counter for the given subset of banks is adjusted in the opposite direction to the advancement direction in which the recency counter is updated at step 146. The amount of the adjustment at step 149 could be fixed, or could be variable dependent on the correlation metric 76 tracking correlation between accesses to different subsets of banks.

Another factor to consider by the power mode selection circuitry 70 can be the energy cost associated with switches between the power saving mode and the operational mode. If nodes within a bank 32 are allowed to drop to a lower voltage level, there can be an energy cost in charging those nodes back up to the level at which they would be maintained during the operational mode. Hence, it may be that a subset of banks 32 would need to remain in the power saving mode for a certain minimum period before the energy cost of transitioning to and from the power saving mode is outweighed by the savings in power achieved by operating in the power saving mode. Hence, for some workloads (where accesses to a given bank keep happening very shortly after the bank is switched to the power saving mode), it might be that total power consumption can be reduced by being less quick to switch to the power saving mode after a period of inactivity for the bank than for other workloads, depending on the access patterns to each subset of banks.

Therefore, in some examples power mode selection circuitry 70 may support two or more different power saving mode usage patterns which could be applied. The power saving mode usage patterns could be different in their aggressiveness with which they apply the power saving mode after a period of inactivity for a particular subset of banks. For example, the power saving mode usage patterns may apply different thresholds for determining based on the recency counter whether the condition for switching to power saving mode is satisfied. The power saving mode usage patterns could also vary based on other parameters, e.g. in terms of which combination of power saving mode measures are used in the power saving mode (allowing power saving measures with a greater energy cost of switching to be enabled or disabled selectively).

The power mode selection circuitry 70 can maintain an energy cost tracking metric 78 which keeps a rolling count (over a time window) of events that correspond to energy usage, such as powering down a bank and powering up a bank, that can be combined to give a predicted energy usage for the window of time. The power mode selection circuitry 70 can calculate the power that would be incurred under a number of alternative power mode usage schemes based on those power events, and at the end of each time window, the lowest-energy scheme can be chosen to be used for the next time window. One of the schemes to track could be a "never enter power saving mode" scheme, so that it can be compared whether other schemes are worse than not using the power saving mode at all.

Figure 12:
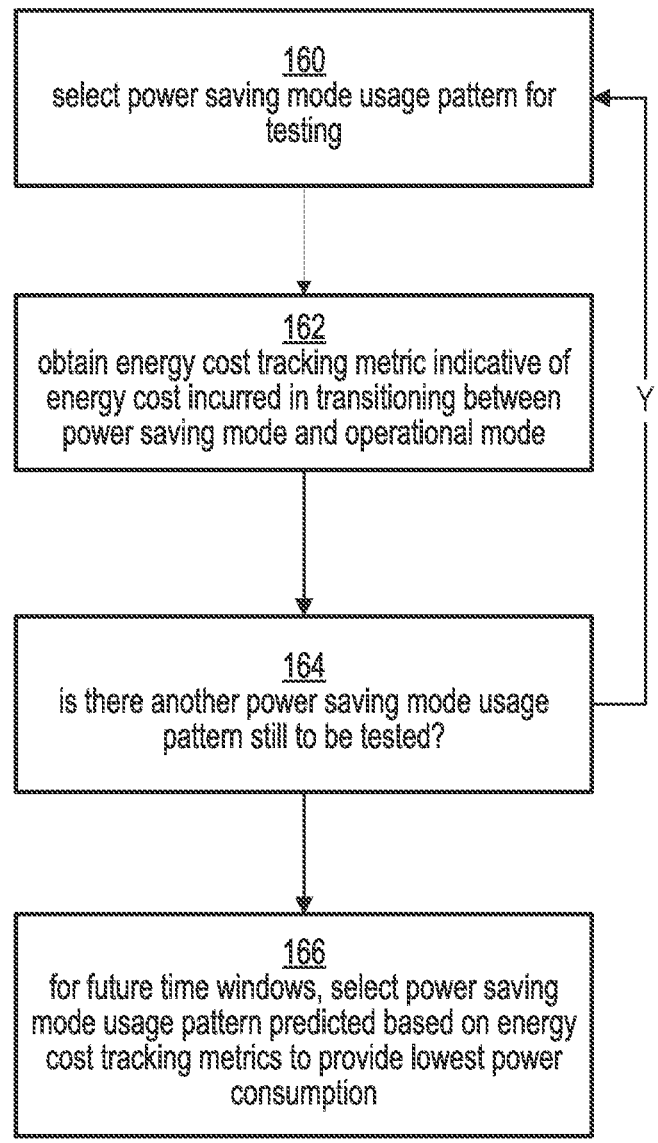
FIG. 12 illustrates a method for selecting a power saving mode usage pattern based on an energy cost tracking metric.

Hence, FIG. 12 illustrates a flow diagram of selecting a power saving mode usage pattern. At step 160 the power mode selection circuitry 70 selects a particular power saving mode usage pattern for testing, and at step 162 obtains an energy cost tracking metric 78 indicative of an energy cost incurred using that power saving mode usage pattern in transitioning between power saving mode and operational mode given access patterns monitored for a current window of time (e.g. the predicted energy cost may be based on adding a certain power cost amount to a running count of total power cost for each time there would have been a switch between power saving mode and operational mode at timings determined based on the access patterns observed during that window of time). At step 164 the power mode selection circuitry 70 determines whether there is another power saving mode usage pattern to be tested, and if so then returns to steps 160 and 162 to test the other power saving mode usage pattern.

Once all power saving mode usage patterns have been tested, then at step 166, the power mode selection circuitry 70 selects the power saving mode usage pattern predicted based on the energy cost tracking metric 78 to provide lowest power consumption, as the power saving mode usage pattern to be used in future time windows. The power mode selection circuitry 70 can repeat the method of FIG. 12 from time to time to review whether the selected usage pattern is still appropriate (given that access patterns may change over time). With this approach, different power mode usage patterns (varying in how aggressively the switch to power saving mode is triggered following a period of inactivity for a given subset of banks) can be tested and reviewed to determine which gives lowest power consumption for the particular access pattern seen by given workload being processed.

While the above example shows the power control circuitry 24 being used to control which subsets of banks 32 are in power saving mode for a memory instance 30 used within the data storage 28 of the shared cache 20, it will be appreciated that this is just one example. In other examples the memory instance 30 and power control circuitry 24 may be provided for other types of storage within the processing system 2, such as the cluster cache 10 or a private cache 6 associated with a particular processor 4.

Concepts described herein may be embodied in a system comprising at least one packaged chip. The memory instance and/or power control circuitry described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 13:
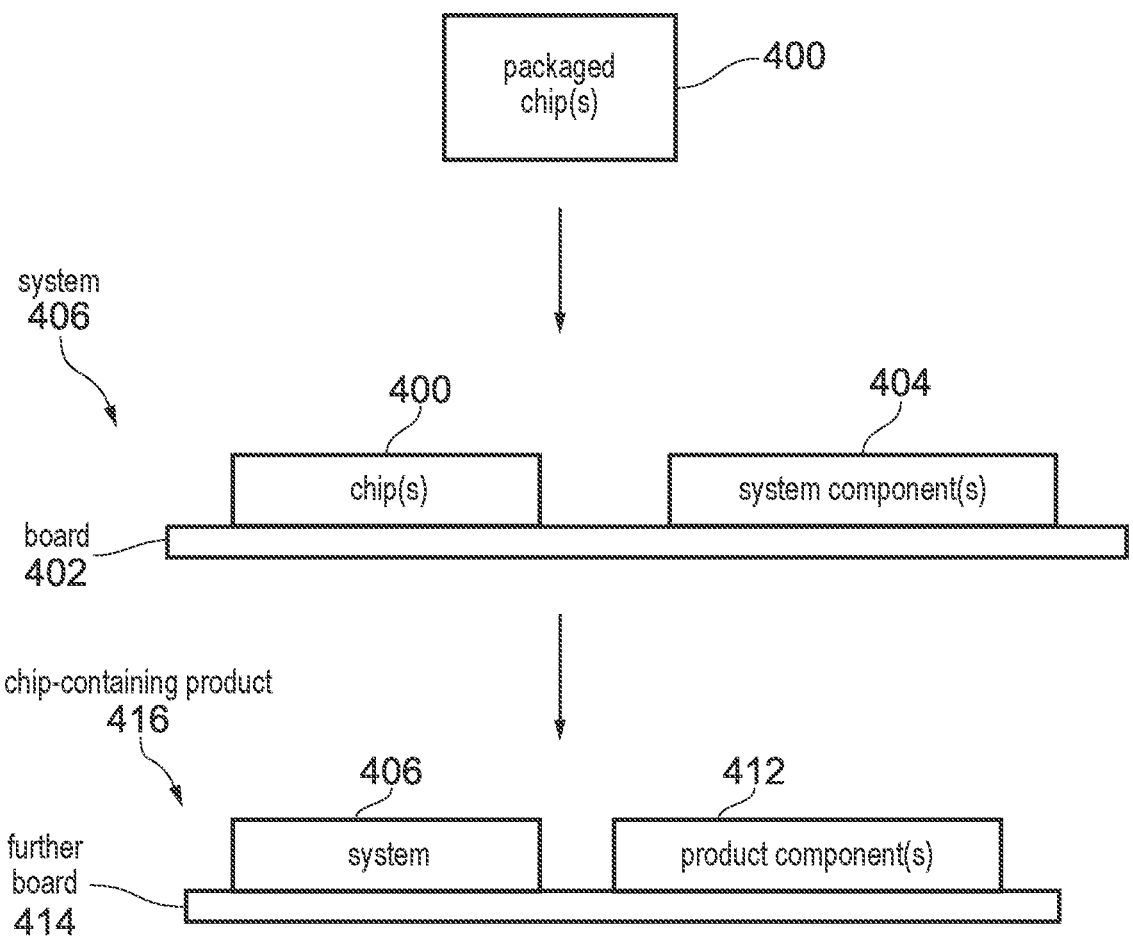
FIG. 13 illustrates a system and a chip-containing product.

As shown in FIG. 13, one or more packaged chips 400, with the memory instance 30 and/or power control circuitry 24 described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the memory instance and/or power control circuitry described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc.

An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. A memory instance comprising:
    a plurality of banks of storage cells to store data values, each bank of storage cells configured to support a power saving mode for retention of the data values in a state in which the storage cells are not readable or writable and power consumption is lower than in an operational mode in which the storage cells are readable and writable;
    input/output circuitry shared between the plurality of banks for receiving write data from external circuitry or outputting read data to the external circuitry;
    a control interface comprising a plurality of power control signal paths to receive power control signals for controlling use of the power saving mode by the plurality of banks; and
    bank power control circuitry to individually control, for each of a plurality of subsets of banks of storage cells within the same memory instance, whether that subset of banks is in the power saving mode based on the power control signals received on the plurality of power control signal paths;
    where for at least one setting for the power control signals, the bank power control circuitry is configured to place one subset of banks of storage cells in the power saving mode while another subset of banks of storage cells is in the operational mode.

2. The memory instance according to clause 1, in which when a given bank is in the power saving mode, the bank power control circuitry is configured to disable precharging of bitlines for the given bank.

3. The memory instance according to any of clauses 1 or 2, in which, when a given bank is in the power saving mode, the bank power control circuitry is configured to disable precharging of write data lines and/or read data lines for the given bank.

4. The memory instance according any of clauses 1 to 3, in which, when a given bank is in the power saving mode, the bank power control circuitry is configured to disable a word line driver configured to drive word lines for the given bank.

5. The memory instance according to any of clauses 1 to 4, in which, when a given bank is in the power saving mode, the bank power control circuitry is configured to disable a word line decoder configured to decode an address to select a word line to be driven for the given bank.

6. The memory instance according to any of clauses 1 to 5, in which when a given bank is in the power saving mode, the bank power control circuitry is configured to reduce a supply voltage supplied to the storage cells of the given bank to a lower voltage level than a voltage level used for the supply voltage in the operational mode.

7. The memory instance according to any of clauses 1 to 6, in which the power control signals comprise a separate power control signal for each subset of banks, each power control signal indicating whether a corresponding subset of banks is to be placed in the power saving mode.

8. The memory instance according to any of clauses 1 to 6, comprising power control signal decoding circuitry to decode the power control signals received on the power control signal paths to generate separate internal power control signals for each subset of banks, each internal power control signal indicating whether a corresponding subset of banks is to be placed in the power saving mode.

9. An apparatus comprising:
   at least one processor; and
   a cache comprising at least one memory instance according to any of clauses 1 to 8.

10. An apparatus comprising:
    coherency control circuitry to manage coherency of data cached in private caches of a plurality of processors; and
    a shared cache associated with the coherency control circuitry and shared between the plurality of processors;
    wherein the shared cache comprises at least one memory instance according to any of clauses 1 to 8.

11. Power mode control circuitry for controlling power mode transitions for a memory instance comprising a plurality of banks of storage cells and input/output circuitry shared between the plurality of banks for receiving write data from external circuitry or outputting read data to the external circuitry;
    the power mode control circuitry comprising:
        power mode selection circuitry to select a selected power mode separately for each of a plurality of subsets of banks within the same memory instance, the selected power mode selected from a plurality of power modes including an operational mode in which the storage cells are readable and writable and a power saving mode for retention of the data values in a state in which the storage cells are not readable or writable and power consumption is lower than in the operational mode, wherein the power mode selection circuitry is configured to select the selected power mode for each subset of banks based on monitoring of accesses to the memory instance; and
        power control signal transmitting circuitry to transmit to the memory instance a plurality of power control signals indicative of the selected power mode for each of the subset of banks.

12. The power mode control circuitry according to clause 11, in which the power mode selection circuitry is configured to trigger a transition of a given subset of banks to the operational mode in response to detecting a tag access request to request a cache tag from tag storage circuitry for an address corresponding to the given subset of banks of the memory instance.

13. The power mode control circuitry according to any of clauses 11 and 12, in which when transitioning two or more subsets of banks from the power saving mode to the operational mode, the power mode selection circuitry is configured to stagger entry into the operational mode for the two or more subsets of banks, to provide a delay between one of the two or more subsets of banks transitioning from the power saving mode to the operational mode and another of the two or more subsets of banks transitioning from the power saving mode to the operational mode.

14. The power mode control circuitry according to any of clauses 11 to 13, in which the power mode selection circuitry is configured to maintain, for each subset of banks, a bank access metric for tracking recency of access to that subset of banks, and to control whether to switch a given subset of banks from the operational mode to the power saving mode depending on the bank access metric for the given subset of banks.

15. The power mode control circuitry according to clause 14, in which, in response to detecting an access to one subset of banks, the power mode selection circuitry is configured to apply an adjustment to the bank access metric for another subset of banks.

16. The power mode control circuitry according to any of clauses 14 and 15, in which the power mode selection circuitry is configured to maintain a correlation metric tracking correlation between accesses to different subsets of banks, and to determine based on the correlation metric a size of the adjustment applied to the bank access metric for the other subset of banks.

17. The power mode control circuitry according to any of clauses 11 to 16, in which the power mode selection circuitry is configured to maintain an energy cost tracking metric indicative of an energy cost incurred in transitioning between the power saving mode and the operational mode in a previous window of time, and to select a power saving mode usage pattern for a future window of time based on the energy cost tracking metric.

18. The power mode control circuitry according to clause 17, in which the power mode selection circuitry is configured to test a plurality of different power saving mode usage patterns and to obtain energy cost tracking metrics for each power saving mode usage pattern, and to select for the future window of time one of the power saving mode usage patterns predicted based on the energy cost tracking metrics to provide lowest power consumption.

19. The power mode control circuitry according to clause 18, in which one of the power saving mode usage patterns comprises a pattern in which the power saving mode is not used at all.

20. A system comprising:
    the memory instance of any of clauses 1 to 8, or the apparatus of any of clauses 9 and 10, implemented in at least one packaged chip;
    at least one system component; and
    a board,
    wherein the at least one packaged chip and the at least one system component are assembled on the board.

21. A chip-containing product comprising the system of clause 20 assembled on a further board with at least one other product component.

22. A system comprising:
    the power mode control circuitry of any of clauses 11 to 19, implemented in at least one packaged chip;
    at least one system component; and
    a board,
    wherein the at least one packaged chip and the at least one system component are assembled on the board.

23. A chip-containing product comprising the system of clause 22 assembled on a further board with at least one other product component.

24. A non-transitory computer-readable medium to store computer-readable code for fabrication of a memory instance comprising:
a plurality of banks of storage cells to store data values, each bank of storage cells configured to support a power saving mode for retention of the data values in a state in which the storage cells are not readable or writable and power consumption is lower than in an operational mode in which the storage cells are readable and writable;
input/output circuitry shared between the plurality of banks for receiving write data from external circuitry or outputting read data to the external circuitry; and
a control interface comprising a plurality of power control signal paths to receive power control signals for controlling use of the power saving mode by the plurality of banks; and
bank power control circuitry to individually control, for each of a plurality of subsets of banks of storage cells within the same memory instance, whether that subset of banks is in the power saving mode based on the power control signals received on the plurality of power control signal paths;
where for at least one setting for the power control signals, the bank power control circuitry is configured to place one subset of banks of storage cells in the power saving mode while another subset of banks of storage cells is in the operational mode.

25. A non-transitory computer-readable medium to store computer-readable code for fabrication of power mode control circuitry for controlling power mode transitions for a memory instance comprising a plurality of banks of storage cells and input/output circuitry shared between the plurality of banks for receiving write data from external circuitry or outputting read data to the external circuitry;
the power mode control circuitry comprising:
power mode selection circuitry to select a selected power mode separately for each of a plurality of subsets of banks within the same memory instance, the selected power mode selected from a plurality of power modes including an operational mode in which the storage cells are readable and writable and a power saving mode for retention of the data values in a state in which the storage cells are not readable or writable and power consumption is lower than in the operational mode, wherein the power mode selection circuitry is configured to select the selected power mode for each subset of banks based on monitoring of accesses to the memory instance; and
power control signal transmitting circuitry to transmit to the memory instance a plurality of power control signals indicative of the selected power mode for each of the subset of banks.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:
1. A memory instance comprising:
a plurality of banks of storage cells to store data values, each bank of storage cells configured to support a power saving mode for retention of the data values in a state in which the storage cells are not readable or writable and power consumption is lower than in an operational mode in which the storage cells are readable and writable;
input/output circuitry shared between the plurality of banks configured to receive write data from external circuitry or to output read data to the external circuitry;
a control interface comprising a plurality of power control signal paths configured to receive power control signals for controlling use of the power saving mode by the plurality of banks;
bank power control circuitry configured to individually control, for each of a plurality of subsets of banks of storage cells within the same memory instance, whether that subset of banks is in the power saving mode based on the power control signals received on the plurality of power control signal paths, wherein for at least one setting for the power control signals, the bank power control circuitry is configured to place one subset of banks of storage cells in the power saving mode while another subset of banks of storage cells is in the operational mode;
coherency control circuitry configured to manage coherency of data cached in private caches of a plurality of processors; and
a shared cache associated with the coherency control circuitry and shared between the plurality of processors, wherein the shared cache includes the memory instance.

2. The memory instance according to claim 1, in which when a given bank is in the power saving mode, the bank power control circuitry is configured to disable precharging of bitlines for the given bank.

3. The memory instance according to claim 1, in which, when a given bank is in the power saving mode, the bank power control circuitry is configured to disable precharging of write data lines and/or read data lines for the given bank.

4. The memory instance according to claim 1, in which, when a given bank is in the power saving mode, the bank power control circuitry is configured to disable a word line driver configured to drive word lines for the given bank.

5. The memory instance according to claim 1, in which, when a given bank is in the power saving mode, the bank power control circuitry is configured to disable a word line decoder configured to decode an address to select a word line to be driven for the given bank.

6. The memory instance according to claim 1, in which when a given bank is in the power saving mode, the bank power control circuitry is configured to reduce a supply voltage supplied to the storage cells of the given bank to a lower voltage level than a voltage level used for the supply voltage in the operational mode.

7. A system comprising:
the memory instance of claim 1, implemented in at least one packaged chip;
at least one system component; and
a board,
wherein the at least one packaged chip and the at least one system component are assembled on the board.

8. A chip-containing product comprising the system of claim 7 assembled on a further board with at least one other product component.

9. Power mode control circuitry for controlling power mode transitions for a memory instance comprising a plurality of banks of storage cells and input/output circuitry shared between the plurality of banks for receiving write data from external circuitry or outputting read data to the external circuitry;
the power mode control circuitry comprising:
power mode selection circuitry to select a selected power mode separately for each of a plurality of subsets of banks within the same memory instance, the selected power mode selected from a plurality of power modes including an operational mode in which the storage cells are readable and writable and a power saving mode for retention of the data values in a state in which the storage cells are not readable or writable and power consumption is lower than in the operational mode, wherein the power mode selection circuitry is configured to select the selected power mode for each subset of banks based on monitoring of accesses to the memory instance; and
power control signal transmitting circuitry to transmit to the memory instance a plurality of power control signals indicative of the selected power mode for each of the subset of banks,
wherein when transitioning two or more subsets of banks from the power saving mode to the operational mode, the power mode selection circuitry is configured to stagger entry into the operational mode for the two or more subsets of banks, to provide a delay between one of the two or more subsets of banks transitioning from the power saving mode to the operational mode and another of the two or more subsets of banks transitioning from the power saving mode to the operational mode.

10. The power mode control circuitry according to claim 9, in which the power mode selection circuitry is configured to trigger a transition of a given subset of banks to the operational mode in response to detecting a tag access request to request a cache tag from tag storage circuitry for an address corresponding to the given subset of banks of the memory instance.

11. A system comprising:
the power mode control circuitry of claim 10, implemented in at least one packaged chip;
at least one system component; and
a board,
wherein the at least one packaged chip and the at least one system component are assembled on the board.

12. A chip-containing product comprising the system of claim 11 assembled on a further board with at least one other product component.

13. The power mode control circuitry according to claim 9, in which the power mode selection circuitry is configured to maintain, for each subset of banks, a bank access metric for tracking recency of access to that subset of banks, and to control whether to switch a given subset of banks from the operational mode to the power saving mode depending on the bank access metric for the given subset of banks.

14. The power mode control circuitry according to claim 13, in which, in response to detecting an access to one subset of banks, the power mode selection circuitry is configured to apply an adjustment to the bank access metric for another subset of banks.

15. The power mode control circuitry according to claim 14, in which the power mode selection circuitry is configured to maintain a correlation metric tracking correlation between accesses to different subsets of banks, and to determine based on the correlation metric a size of the adjustment applied to the bank access metric for the other subset of banks.

16. The power mode control circuitry according to claim 9, in which the power mode selection circuitry is configured to maintain an energy cost tracking metric indicative of an energy cost incurred in transitioning between the power saving mode and the operational mode in a previous window of time, and to select a power saving mode usage pattern for a future window of time based on the energy cost tracking metric.

17. A non-transitory computer-readable medium to store computer-readable code for fabrication of a memory instance comprising:
a plurality of banks of storage cells to store data values, each bank of storage cells configured to support a power saving mode for retention of the data values in a state in which the storage cells are not readable or writable and power consumption is lower than in an operational mode in which the storage cells are readable and writable;
input/output circuitry shared between the plurality of banks for receiving write data from external circuitry or outputting read data to the external circuitry; and
a control interface comprising a plurality of power control signal paths to receive power control signals for controlling use of the power saving mode by the plurality of banks; and
bank power control circuitry to individually control, for each of a plurality of subsets of banks of storage cells within the same memory instance, whether that subset of banks is in the power saving mode based on the power control signals received on the plurality of power control signal paths, wherein for at least one setting for the power control signals, the bank power control circuitry is configured to place one subset of banks of storage cells in the power saving mode while another subset of banks of storage cells is in the operational mode;
coherency control circuitry configured to manage coherency of data cached in private caches of a plurality of processors; and
a shared cache associated with the coherency control circuitry and shared between the plurality of processors, wherein the shared cache includes the memory instance.

18. A non-transitory computer-readable medium to store computer-readable code for fabrication of power mode control circuitry for controlling power mode transitions for a memory instance comprising a plurality of banks of storage cells and input/output circuitry shared between the plurality of banks for receiving write data from external circuitry or outputting read data to the external circuitry;

the power mode control circuitry comprising:

power mode selection circuitry to select a selected power mode separately for each of a plurality of subsets of banks within the same memory instance, the selected power mode selected from a plurality of power modes including an operational mode in which the storage cells are readable and writable and a power saving mode for retention of the data values in a state in which the storage cells are not readable or writable and power consumption is lower than in the operational mode, wherein the power mode selection circuitry is configured to select the selected power mode for each subset of banks based on monitoring of accesses to the memory instance; and power control signal transmitting circuitry to transmit to the memory instance a plurality of power control signals indicative of the selected power mode for each of the subset of banks, wherein when transitioning two or more subsets of banks from the power saving mode to the operational mode, the power mode selection circuitry is configured to stagger entry into the operational mode for the two or more subsets of banks, to provide a delay between one of the two or more subsets of banks transitioning from the power saving mode to the operational mode and another of the two or more subsets of banks transitioning from the power saving mode to the operational mode.

\* \* \* \* \*